(12) United States Patent
Kalkunte et al.

(10) Patent No.: US 12,408,096 B1
(45) Date of Patent: Sep. 2, 2025

(54) COMMUNICATION SYSTEM AND METHOD FOR OPERATING A 5G MESH NETWORK FOR SERVICE CONTINUITY

(71) Applicant: PELTBEAM INC., Sherman Oaks, CA (US)

(72) Inventors: Venkat Kalkunte, Saratoga, CA (US); Mehdi Hatamian, Mission Viejo, CA (US); Puya Rofougaran, Irvine, CA (US); Arman Rofougaran, Newport Coast, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

(21) Appl. No.: 19/203,462

(22) Filed: May 9, 2025

Related U.S. Application Data

(63) Continuation of application No. 17/810,199, filed on Jun. 30, 2022, now Pat. No. 12,328,655.

(Continued)

(51) Int. Cl.
| | |
|---|---|
| *H04W 40/12* | (2009.01) |
| *H04B 17/318* | (2015.01) |
| *H04W 8/00* | (2009.01) |
| *H04W 16/28* | (2009.01) |
| *H04W 40/02* | (2009.01) |

(Continued)

(52) U.S. Cl.
CPC .......... *H04W 40/12* (2013.01); *H04B 17/318* (2015.01); *H04W 8/005* (2013.01); *H04W 16/28* (2013.01); *H04W 40/026* (2013.01); *H04W 40/20* (2013.01); *H04W 40/28* (2013.01);

(Continued)

(58) Field of Classification Search
CPC ... H04W 40/12; H04W 40/026; H04W 40/20; H04W 40/28; H04W 16/28; H04W 76/10; H04W 76/15
See application file for complete search history.

(56) References Cited

U.S. PATENT DOCUMENTS

| | | |
|---|---|---|
| 6,671,265 B1 | 12/2003 | Hwang et al. |
| 6,907,243 B1 | 6/2005 | Patel |

(Continued)

OTHER PUBLICATIONS

Corrected Notice of Allowance for U.S. Appl. No. 17/658,045 dated Oct. 26, 2022.

(Continued)

*Primary Examiner* — Jamal Javaid
(74) *Attorney, Agent, or Firm* — CHIP LAW GROUP

(57) ABSTRACT

A communication system includes a plurality of edge devices comprising a first edge device. The first edge device fires a plurality of first beams from a donor antenna array based on different first beam indexes and fires a plurality of second beams from one or more relay antenna arrays based on different second beam indexes. The first edge device measures signal strength of each fired beam, identifies a donor beam index and one or more relay beam indexes based on the measured signal strengths exceeding a threshold, establishes a first communication link to an upstream neighboring node based on the identified donor beam index, creates one or more second communication links to one or more downstream neighboring nodes based on the identified relay beam indexes, and creates a mesh network of the plurality of edge devices based on the established communication links.

20 Claims, 12 Drawing Sheets

Related U.S. Application Data

(60) Provisional application No. 63/262,564, filed on Oct. 15, 2021.

(51) Int. Cl.

| | | |
|---|---|---|
| *H04W 40/20* | (2009.01) | |
| *H04W 40/28* | (2009.01) | |
| *H04W 48/16* | (2009.01) | |
| *H04W 64/00* | (2009.01) | |
| *H04W 76/10* | (2018.01) | |
| *H04W 76/15* | (2018.01) | |

(52) U.S. Cl.
CPC ......... *H04W 48/16* (2013.01); *H04W 64/003* (2013.01); *H04W 76/10* (2018.02); *H04W 76/15* (2018.02)

(56) References Cited

U.S. PATENT DOCUMENTS

| | | |
|---|---|---|
| 10,581,736 B1 | 3/2020 | Choudhury et al. |
| 11,191,013 B1 | 11/2021 | Kalkunte et al. |
| 11,275,147 B1 | 3/2022 | Kalkunte et al. |
| 11,425,034 B1 | 8/2022 | Boopathy et al. |
| 2008/0304485 A1 | 12/2008 | Sinha et al. |
| 2010/0189115 A1 | 7/2010 | Kitada |
| 2011/0235568 A1 | 9/2011 | Esteves et al. |
| 2015/0282147 A1 | 10/2015 | Schmidt et al. |
| 2016/0094398 A1 | 3/2016 | Choudhury et al. |
| 2016/0174124 A1 | 6/2016 | Basu Mallick et al. |
| 2017/0026292 A1 | 1/2017 | Smith et al. |
| 2017/0142619 A1 | 5/2017 | Petrick |
| 2018/0026731 A1 | 1/2018 | Kim |
| 2018/0254972 A1 | 9/2018 | Patel et al. |
| 2019/0053296 A1 | 2/2019 | Balappanavar et al. |
| 2019/0372837 A1 | 12/2019 | Yang et al. |
| 2021/0051765 A1 | 2/2021 | Rosenschild et al. |
| 2021/0076299 A1 | 3/2021 | Chunduri et al. |
| 2021/0159946 A1 | 5/2021 | Raghavan et al. |
| 2021/0368308 A1 | 11/2021 | Katardjiev et al. |
| 2022/0014963 A1 | 1/2022 | Yeh et al. |
| 2022/0167342 A1* | 5/2022 | Raghavan ........... H04W 72/044 |

OTHER PUBLICATIONS

Corrected Notice of Allowance for U.S. Appl. No. 17/806,562 dated Dec. 27, 2022.
Corrected Notice of Allowance for U.S. Appl. No. 17/951,486 dated Jan. 30, 2023.
Non-Final Office Action for U.S. Appl. No. 17/810,199 dated Oct. 15, 2024.
Non-Final Office Action for U.S. Appl. No. 18/764,806 dated Aug. 23, 2024.
Notice of Allowance for U.S. Appl. No. 17/658,045 dated Nov. 7, 2022.
Notice of Allowance for U.S. Appl. No. 17/806,562 dated Sep. 22, 2022.
Notice of Allowance for U.S. Appl. No. 17/951,486 dated Nov. 28, 2022.
Notice of Allowance for U.S. Appl. No. 18/147,518 dated Mar. 2, 2023.
Notice of Allowance for U.S. Appl. No. 18/341,234 dated Sep. 5, 2023.
Notice of Allowance for U.S. Appl. No. 18/481,454 dated May 10, 2024.
Notice of Allowance for U.S. Appl. No. 18/764,806 dated Oct. 18, 2024.
Notice of Allowance in U.S. Appl. No. 17/658,045 dated Jun. 15, 2022.

* cited by examiner

Downstream

702

| Relay number | Relay bb index | Location Coordinates | Downstream Donor bb index | Distance vector | Link state A-Active D- Dormant | Tags |
|---|---|---|---|---|---|---|
| | | | | Heading LAT/LON | | |
| 1 | | | | | D | Tag-d1 |
| 2 | | | | | A | Tag-d2 |

Upstream

704

| Radio Parameters per Path | Relay bb index | Location Coordinates | Donor bb index | Distance vector- GPS/Heading | Link state A-Active D- Dormant | Tags |
|---|---|---|---|---|---|---|
| 1 | | | | | | Tag-u1 |
| 2 | | | | | | Tag-u2 |

FIG. 7

COMMUNICATION SYSTEM AND METHOD FOR OPERATING A 5G MESH NETWORK FOR SERVICE CONTINUITY

CROSS-REFERENCE TO RELATED APPLICATION/INCORPORATION BY REFERENCE

This Application makes reference to, claims priority to, and claims benefit from, and is a Continuation Application of U.S. patent application Ser. No. 17/810,199 filed on Jun. 30, 2022, which claims priority to United States Provisional Application Ser. No. 63/262,564 filed on Oct. 15, 2021.

FIELD OF TECHNOLOGY

Certain embodiments of the disclosure relate to a wireless communication system. More specifically, certain embodiments of the disclosure relate to a communication system and a communication method for operating a fifth-generation (5G) mesh network for service continuity.

BACKGROUND

Wireless telecommunication in modern times has witnessed the advent of various signal transmission techniques and methods, such as the use of beamforming and beam steering techniques, for enhancing the capacity of radio channels. Latency and high volume of data processing are considered prominent issues with next-generation networks, such as 5G. Currently, the use of edge computing in next-generation networks, such as 5G and upcoming 6G, is an active area of research, and many benefits have been proposed, for example, faster communication between vehicles, pedestrians, infrastructure, and other communication devices. For example, it is proposed that close proximity of conventional edge devices to user equipment (UEs) may reduce the response delay usually suffered by UEs while accessing the traditional cloud. However, there are many open technical challenges for successful and practical use of edge computing in the next generation networks, especially in 5G or the upcoming 6G environment. For example, how to increase coverage of a radio access network (RAN) node (e.g., a small cell or a gNB) given the dynamic nature of the environment for various indoor and outdoor applications without decreasing throughput and while maintaining quality of service (QoS). In a second example, Quality of experience (QoE) is another open issue, which is a measure of a user's holistic satisfaction level with a service provider (e.g., Internet access, phone call, or other carrier network-enabled services). The challenge is how to ensure seamless connectivity as well as QoE given the dynamic nature of the environment without significantly increasing infrastructure cost.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A communication system and a communication method for operating a 5G mesh network for service continuity, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 7 is a diagram that illustrates reachability tables for upstream and downstream communication generated by the central cloud server, in accordance with an embodiment of the disclosure.

DETAILED DESCRIPTION OF THE DISCLOSURE

Certain embodiments of the disclosure may be found in a communication system and a communication method for operating a 5G mesh network (e.g., by executing switching events) for service continuity. The communication system and the communication method of the present disclosure ensure seamless connectivity, improves 5G coverage of a radio access network (RAN) node (e.g., a 5G enabled small cell or a gNB), overcomes signal blockage regions by use of the mesh network (e.g., a 5G mesh network) formed dynamically by a plurality of edge devices under the control of a central cloud server of the communication system, and further enhances Quality of Experience (QoE). The communication system and the method of the present disclosure can effectively handle the dynamic nature of the environment, for example, any sudden and abrupt change in the environment can be handled by smartly operating the 5G mesh network without affecting the service to one or more user equipment (UEs) from a radio access node (RAN) node.

For instance, if any communication link is broken due to a sudden signal blockage or when signal is attenuated abruptly, a first edge device of the communication system executes a switching event in which a new communication link may be established with a second edge device neighboring the first edge device to continue servicing the one or more UEs via the 5G mesh network.

Furthermore, the communication system and the method of the present disclosure significantly improves performance in terms of data throughput and signal-to-noise ratio (SNR) of one or more end-user devices (e.g., UEs) when employed indoors, outdoors, or a combination thereof. The communication system and the method of the present disclosure significantly enhance the coverage of the RAN node to overcome signal blockage regions within a building (i.e., indoors) as well as outside a building (i.e., outdoors, such as nooks and corners around the building) and provides seamless connectivity as well as QoE without significantly increasing infrastructure cost with consistent high-speed, low latency wireless connectivity with improved coverage for ultra-reliable communication. In the following description, reference is made to the accompanying drawings, which form a part hereof, and in which is shown, by way of illustration, various embodiments of the present disclosure.

Figure 1:
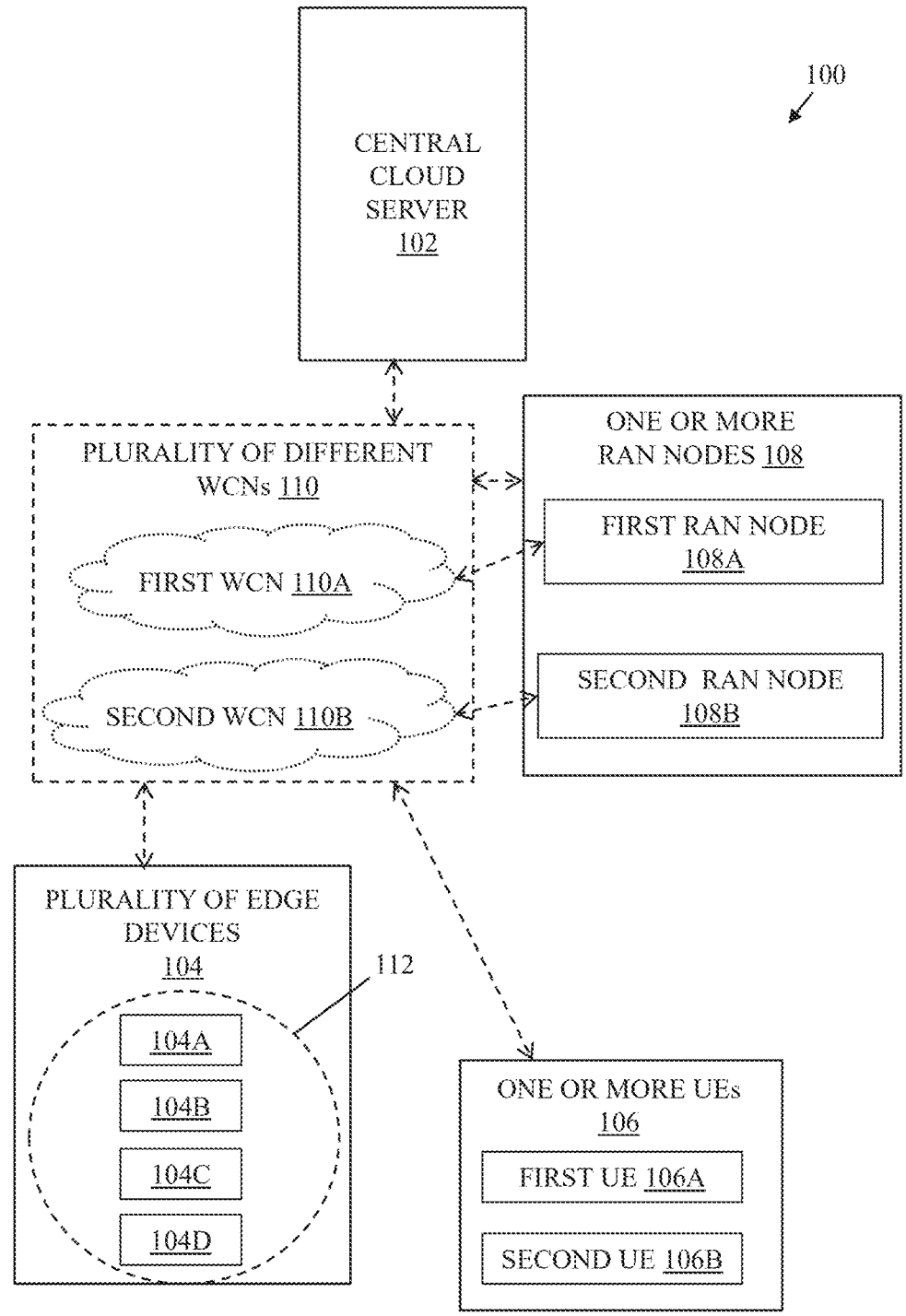
FIG. 1 is a network environment diagram illustrating various components of an exemplary communication system with a central cloud server and a plurality of edge devices, in accordance with an exemplary embodiment of the disclosure.

FIG. 1 is a network environment diagram illustrating various components of an exemplary communication system with a central cloud server and a plurality of edge devices, in accordance with an exemplary embodiment of the disclosure. With reference to FIG. 1, there is shown a network environment diagram of a communication system 100 that includes a central cloud server 102 and a plurality of edge devices 104, such as edge devices 104A, 104B, 104C, and 104D. The communication system 100 may further include one or more user equipment (UEs) 106 and one or more radio access network (RAN) nodes 108. There is further shown a plurality of different wireless carrier networks (WCNs) 110, such as a first WCN 110A of a first service provider and a second WCN 110B of a second service provider. There is further shown a mesh network 112 formed by the plurality of edge devices 104, such as the edge devices 104A, 104B, 104C, and 104D.

The central cloud server 102 includes suitable logic, circuitry, and interfaces that may be configured to communicate with the plurality of edge devices, such as edge devices 104A, 104B, 104C, and 104D, one or more UEs 106 (e.g., the first UE 106A and/or the second UE 106B) and one or more RAN nodes 108 (e.g., the first RAN node 108A and/or the second RAN node 108B). In an example, the central cloud server 102 may be a remote management server that is managed by a third party different from the service providers associated with the one or more RAN nodes 108. In another example, the central cloud server 102 may be a remote management server or a data center that is managed by a third party, or jointly managed, or managed in coordination and association with one or more of a plurality of different wireless carrier networks (WCNs) 110 or network operators, such as the first WCN 110A associated with the first RAN node 108A and the second WCN 110B associated with the second RAN node 108B. In an implementation, the central cloud server 102 may be a master cloud server or a master machine that is a part of a data center that controls an array of other cloud servers communicatively coupled to it for load balancing, running customized applications, and efficient data management.

Each edge device of the plurality of edge devices 104, such as edge devices 104A, 104B, 104C, and 104D, includes suitable logic, circuitry, and interfaces that may be configured to communicate with the central cloud server 102. Each of the plurality of edge devices 104, such as edge devices 104A, 104B, 104C, and 104D, may be referred to as a mesh node or a mesh point of the mesh network 112 formed by the plurality of edge devices 104. Examples of the plurality of edge devices 104 may include, but may not be limited to, an X G-enabled repeater device, an X G-enabled relay device, an XG-enabled customer premise equipment (CPE), an XG-enabled fixed wireless access (FWA) device, an XG-enabled edge communication device, where the XG corresponds to 5G or 6G communication. In an implementation, the XG-enabled repeater device may be a smart repeater device that acts as an integrated CPE and relay device with smart beamforming functions.

Each of one or more UEs 106, such as the first UE 106A and the second UE 106B, may correspond to telecommunication hardware used by an end-user to communicate. Alternatively stated, each of the one or more UEs 106 may refer to a combination of mobile equipment and subscriber identity module (SIM). Each of the one or more UEs 106, such as the first UE 106A and the second UE 106B, may be a subscriber of at least one of the plurality of different WCNs 110. Examples of the one or more UEs 106 may include but are not limited to, a smartphone, a destination device, a virtual reality headset, an augmented reality device, a vehicle, a wireless modem, a home router, a smart television (TV), an Internet-of-Things (IoT) device, or any other customized hardware for telecommunication or a consumer electronic (CE) device capable of wireless communication.

Each of the one or more RAN nodes 108, such as the first RAN node 108A or the second RAN node 108B, may be a fixed point of communication that may communicate information, in the form of a plurality of beams of R F signals, to and from communication devices, such as the first UE 106A, and the plurality of edge devices 104. Each of the one or more RAN nodes 108, such as the first RAN node 108A or the second RAN node 108B, may be a small cell or a base station, such as a gNB (i.e., a 5G radio base station). Multiple base stations and small cells corresponding to one service provider may be geographically positioned to cover specific geographical areas. Typically, bandwidth requirements serve as a guideline for a location of a base station and small cell. The count of base stations and small cells depends on population density and geographic irregularities, such as buildings and mountain ranges, which may interfere with the plurality of beams of RF signals. In this case, two RAN nodes 108A and 108B are shown but in practice there may be many more RAN nodes. In another implementation, the one or more RAN nodes 108 may include eNBs, Master eNBs (MeNBs) (for non-standalone mode), gNBs, and 5G enabled small cells.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of a network infrastructure to provide services to its subscribers over the licensed spectrum, for example, 4G LTE, or 5G spectrum (FR1 or FR2). For example, the first RAN node 108A may be controlled, managed, or associated with the first WCN 110A, and the second RAN node 108B may be controlled, managed, or associated with the second WCN 110B different from the first WCN 110A. The plurality of different WCNs 110 may also include mobile virtual network operators (MVNO).

The mesh network 112 may refer to a 5G mesh network where each edge device cooperate with two or more other neighboring nodes (e.g., one neighboring edge device in upstream and two or more neighboring edge devices in downstream) and are dynamically linked with each other to enable enhancing the 5G cellular coverage of a RAN node, such as the first RAN node 108A, to overcome signal blockage regions within a building (i.e., indoors) as well as outside a building (i.e., outdoors) for ultra-reliable high-performance communication. In this case, the downstream may refer to what a given edge device may be looking to relay down to its next mesh point (i.e., neighboring edge device or neighboring node from one or more relay antenna arrays, e.g., its two relays). The upstream may be defined from a perspective of communication from the donor side of each edge device (i.e., towards its upstream neighboring node).

Beneficially, the central cloud server 102 and the plurality of edge devices 104 exhibit a decentralized model that not only brings cloud computing capabilities closer to UEs (such as the one or more UEs 106) in order to reduce latency but also manifests several known benefits for various service providers associated with the plurality of different WCNs 110. For example, it reduces backhaul traffic by provisioning content at the edge, distributes computational resources geographically in different locations (e.g., on-premises mini cloud, central offices, customer premises, etc.) depending on the use case requirements, and improves the reliability of a network by distributing content between edge devices and the centralized cloud server 102. Apart from these and other known benefits (or inherent properties) of edge computing, the central cloud server 102 improves and solves many open issues related to the convergence of edge computing and the next-generation wireless networks, such as 5G or upcoming 6G. The central cloud server 102 significantly improves the beam management mechanism of 5G new radio (NR), true 5G, and creates a platform for upcoming 6G communications, to achieve low latency and high data rate requirements. The dynamic generation and operation of the mesh network 112 removes the complexity and improves coverage of a RAN node (e.g., the first RAN node 108A) for indoor and outdoor applications. The central cloud server 102 is able to manage heterogeneity in wireless communication in terms of different interfaces, radio access technologies (3G, 4G, 5G, or upcoming 6G), computing technologies (e.g., hardware and operating systems), and even one or more carrier networks of the plurality of different WCNs 110 used by the one or more UEs 106. Moreover, the central cloud server 102 considers the dynamic nature of surroundings holistically by use of the information via the discovery process obtained from the plurality of edge devices 104 in real-time or near real-time to proactively avoid any adverse impact on reliability due to any sudden signal blockage, signal fading, signal scattering, or signal loss, thereby provisioning consistent high-speed, low latency wireless connectivity with improved coverage. Thus, the central cloud server 102 manifest higher QoE as compared to existing systems. Additionally, in some cases, initial access information may be provided in real-time or near real-time via the mesh network 112 and switching of communication paths or links in the mesh network 112 may occur in less than 100 milliseconds, thereby proactively handling and avoiding existing signaling overhead issues that result from quick variations of wireless channels. Furthermore, the mesh network substantially reduces the battery draining issue of the one or more UEs 106 when present indoors or when in motion.

Figure 2:
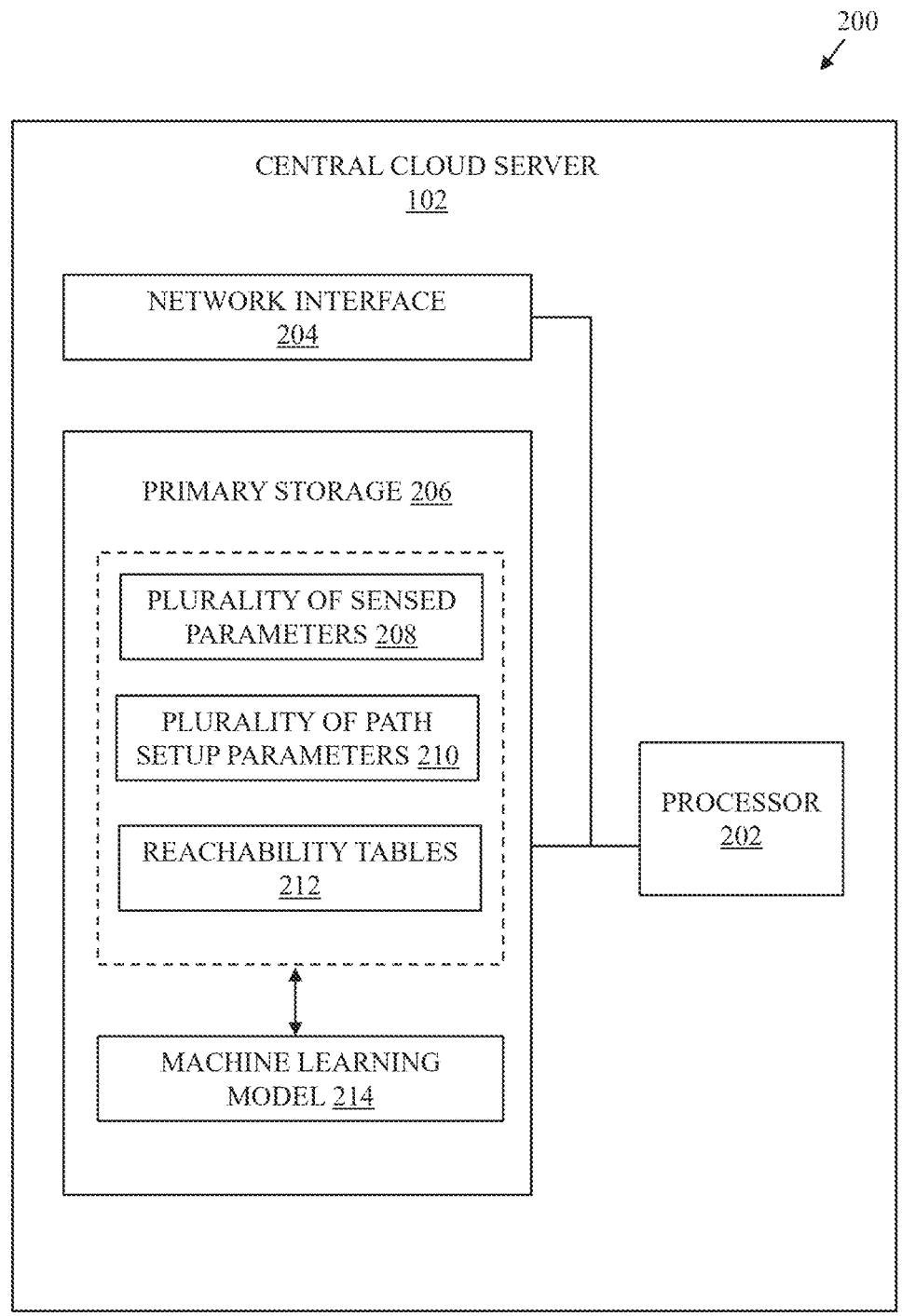
FIG. 2 is a block diagram illustrating different components of an exemplary central cloud server, in accordance with an embodiment of the disclosure.

FIG. 2 is a block diagram illustrating different components of an exemplary central cloud server, in accordance with an embodiment of the disclosure. FIG. 2 is explained in conjunction with elements from FIG. 1. With reference to FIG. 2, there is shown a block diagram 200 of the central cloud server 102. The central cloud server 102 may include a processor 202, a network interface 204, and a primary storage 206. The primary storage 206 may further include a plurality of sensed parameters 208, a plurality of path setup parameters 210, and reachability tables 212. In some implementations, the primary storage 206 may further include a machine learning model 214.

In accordance with an embodiment, each of the plurality of edge devices 104 may be deployed at different locations. For example, each of the plurality of edge devices 104 may be an edge repeater device deployed at a corresponding fixed location to provide a non-line-of-sight (NLOS) transmission path between the one or more RAN nodes 108 and the one or more UEs 106.

In operation, the processor 202 may be configured to cause each of a plurality of edge devices 104 to initiate a discovery process. The discovery process may also be referred to as a discovery protocol or a discovery operation. In an implementation, the central cloud server 102 may be configured to communicate an initiate command to initiate the discovery process at each of the plurality of edge devices 104.

In accordance with an embodiment, in the discovery process, the processor 202 may be further configured to cause each edge device to determine location information of a plurality of neighboring nodes around each edge device of the plurality of edge devices 104. The plurality of neighboring nodes may comprise the two or more neighboring edge devices of the plurality of edge devices 104 or a combination of the two or more neighboring edge devices and the one or more RAN nodes 108 including the first RAN node 108A. Alternatively stated, the discovery process may comprise determining location information of a plurality of neighboring nodes. For example, the edge device 104C may determine its location and also location of the neighboring nodes, such as other nearby edge devices 104A, 104B, and 104D. In some implementations, each edge device of the plurality of edge devices 104 may further comprise a position sensor (e.g., a gyroscope) or a location sensor (e.g., a global positioning system (GPS) sensor or other geospatial location sensor). In such a case, each edge device may determine its location coordinates by use of the position or the location sensor. For example, each edge device may utilize the position sensor and/or the location sensor for outdoor localization (i.e., to determine its location coordinates). In another example, in case of indoor deployment, each edge device may further include Wi-Fi capability, which may be used, for example, to determine its location coordinates or location coordinates of neighboring nodes (e.g., nearby edge devices implemented as mesh nodes) by indoor received signal strength indication (RSSI)-based triangulation or WI-FI™-based triangulation process, known in the art.

In another exemplary implementation, at the time of deployment of the plurality of edge devices 104, a location of each of the plurality of edge devices 104 may be uploaded to the central cloud server 102 along with an identity of the corresponding edge device. The location coordinates may be determined by any other known methods of location estimation, such as a triangulation method, using sounding waves, using sensors, a Radar provided in one or more edge devices, BLUETOOTH™, RSSI from client etc. The discovery of location of each edge device of the plurality of edge devices 104 (i.e., mesh nodes) may be done by any methods known in the art.

In an implementation, the plurality of edge devices 104, such as the edge devices 104A, 104B, 104C, and 104D, may be deployed strategically at different locations to increase coverage and overcome signal blockage so that a beam of RF signal can reach a location previously not reachable. For example, at nooks and corners of a building of an enterprise, behind a building, inside the building at different locations to overcome blockages and at least to create a line-of-sight path with two neighboring nodes. In an example, the plurality of edge devices, such as edge devices 104A, 104B, 104C, and 104D, may be deployed as a private mesh network created for an enterprise. Typically, inter distances among the plurality of edge devices 104 (i.e., the mesh nodes) deployed indoors in an enterprise may be 60-90 meters or 70-80 meters. In another example, the plurality of edge devices 104, such as edge devices 104A, 104B, 104C, and 104D, may be deployed as a public network or a combination of a public and private mesh network for end users.

Each edge device of the plurality of edge devices 104 may comprise a donor antenna array and one or more relay antenna arrays. In an implementation, each edge device may comprise a donor (i.e., a donor antenna array) and two relays (i.e., two relay antenna arrays). In the discovery process, it is to be discovered which beam index to select at both the donor side and the relay side of each device of the plurality of edge device 104. Accordingly, the processor 202 may be further configured to cause each edge device to fire a plurality of different beams from the donor antenna array and the one or more relay antenna arrays of each device of the plurality of edge devices 104. The plurality of different beams may be fired by the donor antenna array of each device of the plurality of edge devices 104 by selecting different beam indexes of a beam book at the donor antenna array. Similarly, the plurality of different beams may be fired by each of the one or more relay antenna arrays of each edge device of the plurality of edge devices 104 by selecting different beam indexes of the beam book at the one or more relay antenna arrays. Each edge device of the plurality of edge devices 104 may be further configured to measure Equivalent Isotropic Radiated Power (EIRP) or RSSI of each fired beam by the donor antenna array and the one or more relay antenna arrays. The plurality of different beams fired from the donor antenna array may also be referred to as a plurality of first fired beams, and the measured signal strength of each fired beam at the donor side of each edge device (e.g., at a neighboring node) may be referred to as a first beam measurement information. Similarly, the plurality of different beams fired from the one or more relay antenna array may also be referred to as a plurality of second fired beams and the measured signal strength of each fired beam at the relay side of each edge device (e.g., at a neighboring node) may be referred to as a second beam measurement information.

In accordance with another embodiment, the processor 202 may be further configured to obtain a plurality of sensed parameters 208 from each edge device of the plurality of edge devices 104 based on the discovery process at each edge device of the plurality of edge devices 104. The plurality of sensed parameters 208 are associated with the donor antenna array and the one or more relay antenna arrays of each edge device. The plurality of sensed parameters 208 may be assessed at each edge device with respect to its corresponding two or more neighboring edge devices.

In accordance with an embodiment, the plurality of sensed parameters 208 obtained periodically from each edge device may comprise the first beam measurement information for the plurality of first fired beams by the donor antenna array of each edge device for a plurality of different donor beam indexes at each edge device of the plurality of edge devices 104. The first beam measurement information includes signal strength values (or SNR) for each of the plurality of first fired beams at the receiver side (e.g., the signal strength of beams received at other nearby edge devices of each edge device). The plurality of sensed parameters 208 may further comprise the second beam measurement information for the plurality of second fired beams by the one or more relay antenna arrays of each edge device for a plurality of different relay beam indexes at each edge device of the plurality of edge devices 104. The second beam measurement information include signal strength values for each of the plurality of second fired beams (fired by the one or more relay antenna arrays) at the receiver side (e.g., signal strength of beams received at other nearby edge devices of each edge device). The plurality of sensed parameters 208 obtained from each edge device of the plurality of edge devices 104 may further include location coordinates and measurement data (e.g., the signal strength values in terms of received signal strength indicator (RSSI), transmitted signal strength indicator (TSSI), Signal-to-noise ratio (SNR), capability of carrier signals of fired beams to decode Primary Synchronization Signal (PSS) at the receiver side, and the like).

In accordance with an embodiment, the plurality of sensed parameters 208 obtained periodically from each edge device further comprises location coordinates of each edge device and a unique identifier of each edge device of the plurality of edge devices 104. The unique identifier is used to know from which edge device and from which location, the first beam measurement information and the second beam measurement information are obtained by the central cloud server 102. By use of the discovery process, each edge device of the plurality of edge devices 104 may be configured to exchange information with the central cloud server 102.

In accordance with an embodiment, the plurality of edge devices 104 may comprise a root mesh node (e.g., the edge device 104A) communicatively coupled to the first RAN node 108A and a set of child mesh nodes (e.g., the edge devices 104B, 104C, and 104D) that are communicatively coupled directly or indirectly to the root mesh node in the mesh network 112. The root mesh node may be an edge device, such as the edge device 104A, of the plurality of edge devices 104 which may be in a suitable communication range to the first RAN node 108A (e.g., a small cell or a gNB) and/or may be directly linked to the first RAN node 108A. The first RAN node 108A may be a small cell or a gNB that may implement beam sweeping by changing beam direction for each synchronization signal block (SSB) transmission. It is to be understood that the number of different beams transmitted by the first RAN node 108A is determined by how many SSBs are being transmitted within a SSB Burst Set (e.g., a set of SSBs being transmitted in 5 ms window of SSB transmission). Multiple SSBs may be transmitted with a certain interval, and each SSB can be identified by a unique number called SSB index (SSB index 0, 1, 2, 3, . . . , n). Moreover, each SSB is transmitted via a specific beam radiated in a certain direction, and each SSB index may be mapped to each beam.

In accordance with an embodiment, the root mesh node, for example, the edge device 104A may be configured to measure the signal strength of each SSB it detected for a certain period (a period of one SSB Set) and may identify the SSB index with the strongest signal. Thus, the root mesh node, such as the edge device 104A, may be directly linked to the first RAN node 108A (e.g., a small cell or a gNB). The challenge for the root mesh node and the central cloud server 102 is how to reach to the one or more UEs 106 for uplink and downlink communication if there are some signal blockage regions, no direct line-of-sight, inadequate 5G cellular coverage and further, which edge devices to employ among the plurality of edge devices 104 to service the one or more UEs 106. In other words, it is a challenge how to increase coverage of the first RAN node 108A (e.g., a small cell or a gNB) for various indoor and outdoor applications without decreasing throughput and while maintaining the quality of service (QoS). Another challenge is how to ensure seamless connectivity as well as QoE without significantly increasing infrastructure costs. The central cloud server 102 achieves and overcomes one or more such technical challenges by dynamically forming the mesh network 112.

5G Mesh Network Formation

In accordance with another embodiment, the processor 202 of the central cloud server 102 may be further configured to determine a plurality of path setup parameters 210 specific for each edge device of the plurality of edge devices 104 based on the obtained plurality of sensed parameters 208 from each edge device of the plurality of edge devices 104. The plurality of path setup parameters 210 determined specifically for each edge device may comprise at least location coordinates of the corresponding two or more neighboring edge devices to be connected by each edge device, a donor beam index to be selected for the donor antenna array of each edge device, and one or more relay beam indexes to be selected for the one or more relay antenna arrays of each edge device. The donor beam index identified to be selected for the donor antenna array of each edge device may be the one having the highest signal strength or a signal strength greater than a threshold and most suited to establish a communication link with a corresponding upstream neighboring node. Similarly, the one or more relay beam indexes identified to be selected for the one or more relay antenna arrays of each edge device may be the one having highest signal strength or a signal strength greater than a threshold and most suited to establish a corresponding communication link with corresponding one or more downstream neighboring nodes. The processor 202 may be further configured to communicate the plurality of path setup parameters 210 determined specifically for each edge device, to each corresponding edge device of the plurality of edge devices 104, and the mesh network is formed based on the communicated plurality of path setup parameters. The plurality of path setup parameters 210 may be stored in the reachability tables 212. There may be different reachability table used for upstream and the downstream communication. A n example of the reachability tables 212 is shown and described in detail, for example, in FIG. 7. In some implementation, the communication of the plurality of path setup parameters 210 and the receipt of the plurality of sensed parameters 208 may be via a management plane that may be out-of-band communication channel. In some implementation, the communication of the plurality of path setup parameters 210 may be via a control plane, for example, using LTE control channel. Thus, the mesh network 112 may be generated and operated via the management plane or the control plane and may be referred to as a location aware path routing mesh network. Based on the communicated plurality of path setup parameters 210 to each corresponding edge device of the plurality of edge devices 104, the processor 202 may be further configured to cause the plurality of edge devices 104 to form the mesh network 112 such that a spatial coverage (e.g., the 5G cellular coverage of the first RAN node 108A) of at least a RAN node, such as the first RAN node 108A, may be increased to serve one or more UEs 106, such as the first UE 106A (previously unreachable due to signal blockage), which are stationary or in motion via the mesh network 112 with a throughput rate greater than a threshold, for example, in a multi-gigabit throughput rate.

In an implementation, the processor 202 may determine the plurality of path setup parameters 210 by use of the machine learning model 214. The machine learning model 214 may be periodically updated on the plurality of data points of the plurality of sensed parameters 208. The processor 202 may cause the machine learning model 214 to find correlation among such data points of the plurality of sensed parameters 208 to be used for a plurality of predictions and formulate rules to establish, maintain, and select one or more edge devices in advance for various signal obstruction scenarios to serve the one or more UEs 106 and to identify improved (e.g., optimal) signal transmission paths to reach to the one or more UEs 106. In some implementations, the central cloud server 102 may be further configured to receive information of reflective and signal obstruction objects from the plurality of edge devices 104. In such implementation, the processor 202 may be further configured to detect where reflective objects are located and used that information in radiation pattern of the RF signals, such as 5G signals. The information of reflective and signal obstruction objects may be used to configure the radiation pattern so that it is correlated to areas such that reflection of the communicated R F signals is mitigated or eliminated. This means that when one or more beams of RF signals are communicated from the plurality of edge devices 104, comparatively significantly lower or almost negligible RF signals are reflected back to the plurality of edge devices 104. The location of the reflective objects and the correlation of the areas associated with reflective objects with the radiation pattern to design enhanced or most suited beam configurations may be further used by the processor 202 to formulate rules for later use.

In accordance with an embodiment, the processor 202 may be further configured to cause each edge device to identify a donor beam index, from amongst a plurality of beam indexes stored at each edge device, for the donor antenna array of each edge device. Thereafter, the processor 202 may be further configured to cause each edge device to fire a beam of radio frequency (RF) signal from the donor antenna array of each edge device in a specific direction indicated by the identified donor beam index towards their corresponding upstream neighboring node in order to establish the communication link to the corresponding upstream neighboring node. Thus, the processor 202 may then be configured to cause each device to establish a communication link to a corresponding upstream neighboring node of the plurality of neighboring nodes based on the identified donor beam index for the donor antenna array of each edge device and location information of the corresponding upstream neighboring node. The location information of the corresponding upstream neighboring node indicates a distance between two edge devices, which wants to establish communication so that an appropriate radiation pattern may be selected for the fired beam to establish the communication link to a corresponding upstream neighboring node. In some implementations, the processor 202 may be further configured to cause each edge device to fire the beam of R F signal from the donor antenna array of each edge device in a specific direction indicated by the identified donor beam index towards their corresponding upstream neighboring node in a specific radiation pattern depending on a distance of each edge device from their corresponding upstream neighboring node in order to establish the communication link to the corresponding upstream neighboring node.

Similar to the identification of the most suitable donor beam index, in accordance with an embodiment, the processor 202 may be further configured to cause each edge device to identify one or more relay beam indexes, from amongst a plurality of beam indexes stored at each edge device, for the one or more relay antenna arrays of each edge device. Thereafter, the processor 202 may be further configured to cause each edge device to fire one or more beams of R F signals in one or more specific directions indicated by the identified one or more relay beam indexes towards the one or more corresponding downstream neighboring nodes from the one or more relay antenna arrays in order to establish the one or more communication links to the one or more corresponding downstream neighboring nodes. In one implementation, the processor 202 may be further configured to cause each edge device to fire one or more beams of R F signals from the one or more relay antenna arrays in one or more specific directions indicated by the identified one or more relay beam indexes towards the one or more corresponding downstream neighboring nodes in one or more radiation patterns depending on a corresponding distance of each edge device from the one or more corresponding downstream neighboring nodes in order to establish the one or more communication links. The processor 202 may then cause each edge device to establish one or more communication links to one or more corresponding downstream neighboring nodes of the plurality of neighboring nodes based on the identified one or more relay beam indexes for the one or more relay antenna arrays of each edge device and the location information of each of the one or more corresponding downstream neighboring nodes. Furthermore, based on the communicated plurality of path setup parameters 210 to each corresponding edge device of the plurality of edge devices 104, the processor 202 may be further configured to cause the plurality of edge devices 104 to form a mesh network 112 such that a spatial coverage of at least the first RAN node 108A may be increased to serve one or more UEs 106 via the mesh network 112 with a throughput rate greater than a threshold (e.g., a multi-gigabit data throughput rate). An example of the formation of the mesh network 112 is further described in detail, in FIGS. 4 to 8.

Operating 5G Mesh Network and Executing Switching Events

In one aspect of the present disclosure, the processor 202 of the central cloud server 102 may be further be configured to determine a primary communication path between a radio access network (RAN) node (e.g., the first RAN node 108A) and one or more user equipment (UEs) 106 via a first set of edge devices (e.g., the edge devices 104A, 104B, and 104D) of the plurality of edge devices 104. Each edge device of the plurality of edge devices 104 is configured as a mesh node of the mesh network 112. Similarly, the processor 202 of the central cloud server 102 may be further configured to determine a secondary communication path between the RAN node (e.g., the first RAN node 108A) and the one or more UEs 106 via a second set of edge devices (e.g., the edge devices 104A, 104C, and 104D) of the plurality of edge devices 104. In an example, the processor 202 may be configured to use the plurality of path setup parameters 210 to determine the primary communication path and the secondary communication path. The plurality of path setup parameters 210 are stored as a path tag, simply referred to as a tag, where each tag defines a communication link and one or more communication links together may a communication route from a source node (e.g., the root mesh node) to reach a destination node (e.g., the target UE to be served) and vice versa via the mesh network 112. Thus, the communication path may be a communication link, or a communication route depending on how to reach and connect to the end-user to be served. For example, each tag defines the communication link between edge devices of the first set of edge devices, such as between the edge devices 104A and 104B, and also between the edge devices 104B and 104D. In this example, the one or more communication links between the edge devices 104A, 104B, and 104D together may form the primary communication path between the radio access network (RAN) node (e.g., the first RAN node 108A) and the one or more UEs 106.

Each tag may define the communication link between edge devices of the second set of edge devices, such as between the edge devices 104A and 104C, and also between the edge devices 104C and 104D. As a result, the one or more communication link between the edge devices 104A, 104C, and 104D together may establish the secondary communication path between the RAN node (e.g., the first RAN node 108A) and the one or more UEs 106. In an implementation, the primary communication path may be determined through a smaller number of edge devices (i.e., shortest path) of the plurality of edge devices 104 from the RAN node (e.g., the first RAN node 108A) to the one or more UEs 106 with maximum enhanced coverage. Moreover, the secondary communication path may be a backup option that may be determined to provide an alternative path with maximum enhanced coverage and ultra-reliable high-performance communication from the RAN node (e.g., the first RAN node 108A) to the one or more UEs 106 via the second set of edge devices of the plurality of edge devices 104.

In an implementation, the processor 202 may be further configured to determine a plurality of secondary communication paths (i.e., a plurality of backup connectivity options) between the RAN node (e.g., the first RAN node 108A) and the one or more UEs 106 (e.g., the first UE 106A) via different sets of edge devices of the plurality of edge devices 104. In an implementation, each of the plurality of secondary communication paths may be determined based on the tags associated with the plurality of secondary communication paths. Moreover, each path from the plurality of secondary communication paths may be beneficial to provide the enhanced coverage and ultra-reliable high-performance communication from the RAN node (e.g., the first RAN node 108A) to the one or more UEs 106 via different set of edge devices of the plurality of edge devices 104. In another implementation, the processor 202 may be further configured to rank each of the plurality of secondary communication paths in terms of one or more signal quality parameters, and each of the plurality of secondary communication paths is used as backup communication paths in a sequential order based on the ranking. For example, EIRP and RSSI may be the signal quality parameters. In an implementation, the processor 202 may be configured to rank each of the plurality of secondary communication paths based on the tags associated with each of the plurality of secondary communication paths. Furthermore, the secondary communication path with a first rank is used firstly, and similarly, subsequent secondary communication paths may be used as the backup communication paths. In an example, the processor 202 may be configured to constantly track alternative paths in the background for a better secondary communication path based on the ranking of each of the plurality of secondary communication paths. By virtue of ranking each of the plurality of secondary communication paths, the processor 202 may select the most suitable alternative first and then dynamically select the second alternative when first alternative fails to overcome signal blockage regions within a building (i.e., indoors) as well as outside a building (i.e., outdoors) for ultra-reliable communication, to reach to the destination node to be served.

In accordance with an embodiment, the first set of edge devices amongst the plurality of edge devices 104 in the mesh network 112 may be caused to establish the primary communication path to serve the one or more UEs 106 for uplink and downlink communication. It is observed that there is a substantial difference or drop in decibels dB, for example, about 5-8 dB difference when two extreme beam indexes are selected at each device. It is further observed that 5-8 dB difference is enough to substantially increase or decrease the data throughput rate. In some cases, it was observed that the throughput increased from 1 GB to 2.4 GB by the selection of appropriate beam index. Thus, it is initially identified which are the right beams indexes to be selected and it may be determined by finding a heading vector. For example, say using two determined location coordinates of two mesh nodes, the heading vector may be found. However, the firing of beams and collecting of measurement data (e.g., EIRP, RSSI, etc.), may still be executed in the backend. This backend scanning may be executed as there may be some reflective objects or reflective paths at some locations or due to dynamic nature of the environment, and thus one of the previously identified beam index and corresponding beam may become weaker or some other beams may become stronger. Thus, a periodic discovery is performed at each edge device (i.e., each mesh node) to cater to such change in reflective paths. Such path(s) may be kept ready as backup or alternative paths, which may be fallback options. In other words, when a primary path is broken, a secondary path is activated.

The processor 202 of the central cloud server 102 may be further be configured to cause the first set of edge devices (e.g., the edge devices 104A, 104B, and 104D) to establish the determined primary communication path to service the one or more UEs 106 for uplink and downlink communication. The primary communication path may be established based on the communicated path setup parameters specific to each of the first set of edge devices (e.g., the edge devices 104A, 104B, and 104D). The processor 202 of the central cloud server 102 may send the path setup parameters to each mesh point, such as the first set of edge devices (e.g., the edge devices 104A, 104B, and 104D) to service the one or more UEs 106 for uplink and downlink communication.

The processor 202 of the central cloud server 102 may be configured to control switching from the primary communication path to the determined secondary communication path within a threshold time based on a presence of a signal obstruction in the primary communication path to maintain a continuity in the service to the one or more UEs 106 for the uplink and downlink communication. In an implementation, the signal obstruction may be present due to the obstructions or movement of the one or more UEs 106, as a result, the uplink communication and the downlink communication of the corresponding one or more UEs 106 may be affected. The signal blockage or the presence of a signal obstruction in the primary communication path may be known to the processor 202 based on the periodic information received from at least each of the participating edge devices, such as the first set of edge devices (e.g., the edge devices 104A, 104B, and 104D) that are used to form the primary communication path. Thereafter, the processor 202 is configured to maintain continuity in the service to the one or more UEs 106 for the uplink and downlink communication by switching from the primary communication path to the secondary communication path within the threshold time (e.g., less than 100 milliseconds) based on the presence of the signal obstruction in the primary communication path. Thus, the primary communication path may be made dormant, and the secondary communication path may be made active. In one example, in case of signal blockage, even an instruction may be sent in advance to each participating edge device of the primary communication path, to autonomously trigger the switching to the second communication path as it is preloaded with tags corresponding to one or more alternative paths. In another example, the central cloud server 102 may be configured to trigger such switching events based on the periodic information received by each of the plurality of edge devices, for example, via the Open Shortest Path First (OSBF) scheme. In some cases, the signaling may be done via an LTE channel, although not frequently, to minimize network load. In other words, on attachment failure via the primary communication path, alternate path setup parameters are issued by the central cloud server 102 for path recovery, such as switching from the primary communication path to the secondary communication path. The path recovery may be autonomously triggered locally at the concerned edge device (e.g., the edge device 104B) or may be directed from the central cloud server 102. By virtue of switching from the primary communication path to the determined secondary communication path within the threshold time, the processor 202 significantly improves performance in terms of data throughput and signal-to-noise ratio (SNR) of one or more end-user devices (e.g., UEs) when employed in indoors, outdoors, or a combination thereof.

In accordance with an embodiment, the control of the switching from the primary communication path to the determined secondary communication path includes gradually decreasing a gain of an active path that corresponds to the primary communication path until the active path becomes dormant. In other words, the presence of the signal obstruction in the primary communication path causes the processor 202 to momentarily check if the primary communication path is able to provide a signal, such that if the PSS can be decoded or not. Moreover, if the PSS cannot be decoded, then the processor 202 may be configured to gradually decrease the gain of the primary communication path, due to which the primary communication path becomes dormant (i.e., inactive). In accordance with another embodiment, the control of the switching from the primary communication path to the determined secondary communication path further includes concomitantly and gradually increasing the gain of a dormant path that corresponds to the secondary communication path until the dormant path becomes a new active path. In an implementation, the change or switching from the primary communication path to the determined secondary communication path within a threshold time (e.g., less than 100 milliseconds) may be considered as a smooth type of change. Such switching may be considered as a smooth type of change where a gain of the currently active path may be decreased gradually and the gain of currently dormant path (i.e., the secondary communication path) is gradually increased, which then becomes active and a new primary communication path. In an example, the processor 202 may be configured to align the timings with the frames for the secondary communication path to concomitantly and gradually increase the gain of the dormant path until the dormant path becomes the new active path.

In accordance with another embodiment, the processor 202 may be configured to periodically check whether the new active path has a signal strength greater than a threshold to maintain the continuity in the service to the one or more UEs for the uplink and downlink communication. The processor 202 may be configured to periodically (i.e., momentarily) check whether the secondary communication path (i.e., new active path) is able to provide signal, such that if the PSS can be decoded at the other side (e.g., neighboring mesh node) or not. Further, if the PSS can be decoded, then the secondary communication path has sufficient signal strength greater than the threshold to maintain the continuity in the service to the one or more UEs 106 for the uplink and downlink communication and to enable ultra-reliable high-performance communication in gigabit data rate. In an example, if the PSS cannot be decoded, then the processor 202 may be configured gradually decrease the gain of the new active path and also to concomitantly and gradually increase the gain of the dormant path from the plurality of secondary communication paths to maintain the continuity in the service to the one or more UEs 106 for the uplink and downlink communication.

In accordance with another embodiment, the processor 202 may further be configured to cause at least one edge device of the second set of edge devices to fire one or more beams of radio frequency (RF) signals in one or more specific directions towards one or more new neighboring nodes in order to establish the determined secondary communication path. In an implementation, the location information of the one or more new neighboring nodes indicates a distance between two edge devices which needs to establish communication so that an appropriate radiation pattern may be selected for the fired one or more beams of RF signals to establish the determined secondary communication path to a corresponding new neighboring node. In some implementations, the processor 202 may be further configured to cause each edge device to fire the one or more beams of R F signal from the donor antenna array of each edge device in a specific direction indicated by the identified donor beam index towards their corresponding upstream neighboring node in a specific radiation pattern depending on a distance of each edge device from their one or more new neighboring nodes in order to establish the determined secondary communication path to the corresponding one or more neighboring nodes.

In accordance with another embodiment, the control of the switching from the primary communication path to the determined secondary communication path is executed via a management plane of the mesh network 112. In an implementation, the management plane of the mesh network 112 may be controlled by the central cloud server 102. In another example, the management plane of the mesh network 112 may be controlled by a scheduler of the first RAN node 108A (e.g., a small cell). In such a case, the scheduling of switching from the primary communication path to the determined secondary communication path may be controlled ahead-of-time and accordingly switching may be done for an upcoming radio frame when a particular SFN or a sub-frame of a radio frame is detected (i.e., at frame level or even at sub-frame level) so that it is less disruptive for network and a continuity of uplink and downlink communication can be achieved improving the quality of service (QoS).

In another aspect of the present disclosure, in certain scenarios, there may be an abrupt change in a surrounding environment which may require to make an abrupt change in switching from one communication path to another communication path to maintain service continuity. In case an abrupt type of change is made, it may be better to do it at the time (i.e., an upcoming time) when a certain radio frame is encountered where there is null or no symbols in order to not disrupt a communication channel. In order to do that, a system frame number (SFN) may be decoded as part of a given SSB, where the mesh nodes may be time aligned. For example, the central cloud server 102 (or the first RAN node 108A) may be configured to communicate a command to two mesh nodes A and B to change their communication links and beams for next cycle to create a new communication path. The central cloud server 102 (or the first RAN node 108A) may be configured to send to the two mesh nodes A and B, timing information, i.e., when to do that, switching to the new path in order to be synchronized.

For instance, for the abrupt type of change, firstly, the processor 202 of the central cloud server 102 may be configured to determine the primary communication path between the RAN node (e.g., the first RAN node 108A) and one or more UEs 106, via a first set of edge devices (e.g., the edge devices 104A and 104D) of the plurality of edge devices 104, where each edge device of the first set of edge devices (e.g., the edge devices 104A and 104D) may be configured as a mesh node of the mesh network 112. The processor 202 of the central cloud server 102 may be further configured to cause the first set of edge devices (e.g., the edge devices 104A and 104D) to establish the determined primary communication path to service the one or more UEs 106 for uplink and downlink communication. Thereafter, the processor 202 of the central cloud server 102 may be further configured to communicate timing information to at least a first edge device (e.g., the edge device 104A) and a second edge device (e.g., the edge device 104B) of the plurality of edge devices 104. The timing information may be indicative of a unique system frame number (SFN), where at least one of the first edge device (e.g., the edge device 104A or a mesh node A) and the second edge device (e.g., the edge device 104B or a mesh node B) may be a new mesh node (e.g., the edge device 104B) not included in the first set of edge devices (e.g., the edge devices 104A and 104D) to create an alternative path. The processor 202 of the central cloud server 102 may be further configured to cause the first edge device (e.g., the edge device 104A) and the second edge device (e.g., the edge device 104B) to execute a switching event to establish a new communication path based on the communicated timing information. In this case, the switching event may be executed at least at the first edge device (e.g., the edge device 104A or the mesh node A) and the second edge device (e.g., the edge device 104B or the mesh node B) when the unique SFN is detected at the first edge device and the second edge device to establish the new communication path to maintain a continuity in the service to the one or more UEs 106 for the uplink and downlink communication.

Further, it is known a given transmitting device (i.e., a transmitter) and a given receiver device (i.e., a receiver) has their own clock, and they have to synchronize the clock before the communication starts. Simply stated, in LTE, like the clock arms, one arm ticks in 10 ms interval, which has numbers between 0 and 1023 and these numbers are called SFN (System Frame Number) and the other arm ticks in 1 ms interval, which has numbers between 0 and 9, and this number is called subframe number. When the subframe number hits the max value (i.e., 9), it goes back to 0 and the SFN number gets increased by 1. When the SFN number hits the max value (i.e., 1023), it goes back to 0. Typically, a UE and a base station (i.e., eNB) in LTE need to maintain the synchronization on subframe number and SFN during the whole communication period. N ow, Similar to LTE, 5G NR also have a System Frame Number (SFN) 0 to 1023 and requires 10 bits to represent SFN. The 6 bits for SFN can be obtained from the master information block (MIB) (i.e., broadcast information) transmitted by the RAN node (e.g., a gNB) periodically and remaining 4 bits are usually derived from physical Broadcast Channel (PBCH) payload.

In an example, the timing information may be communicated ahead-of-time to the first edge device (e.g., the edge device 104A or a mesh node A) and the second edge device (e.g., the edge device 104B or a mesh node B) indicating that the unique SFN may be upcoming and that when the unique system frame number is detected, each of the first edge device and the second edge device is expected to select a new beam index and change a beam pattern to establish the new communication path in the switching event. Alternatively stated, a management plane may be used to send the two mesh nodes A and B, the timings ahead of time that a frame number "I" ($SFN_i$), say a particular SFN, is upcoming and that when the two mesh nodes A and B detects such $SFN_i$, both of the mesh nodes A and B are expected to switch in a certain way (e.g., select a new beam index and change beam patterns for the mesh node A and node B to create the new communication path) so that it is less disruptive for network and continuity of uplink and downlink communication can be achieved improving the quality of service (QoS).

In another example, a given radio frame has different symbols, and the SFN may be tracked, so in order to synchronize such switching event between the two mesh nodes A and B (i.e., the first edge device and the second edge device). The processor 202 of the central cloud server 102 (independently or in coordination with the first RAN node 108A) may be configured to send a command to the two mesh nodes A and B (i.e., the first edge device and the second edge device) that at $SFN_{1000}$, execute switching and change the beam pattern from X to Y. Such SFN, say $SFN_{1000}$, communicated is unique across the whole network (the cellular network including the mesh network 112). This helps to establish a new communication link between the first edge device (e.g., mesh node A) and the second edge device (e.g., mesh node B), where a new edge in the mesh network 112 (e.g., the second edge device) may be a new mesh node (e.g., the edge device 104B or the mesh node B) not included in the first set of edge devices (e.g., the edge devices 104A and 104D) but used now to create alternative path).

In an implementation, the switching event may be executed to create the new communication link and may not be hoping event among multiple mesh nodes to create a new route or end to end path. However, if the central cloud server 102 (or the first RAN node 108A) has a table, such as a reachability table, and it is known by the central cloud server 102 (or the first RAN node 108A) ahead of time what data to send in which frame, then such SFN or a sub-frame may be used to create the new communication path between the source node (e.g., the first RAN node 108A) and one or more destination nodes (e.g., the one or more UEs 106) via the change (i.e., newly created communication path that hops among multiple mesh nodes to reach the one or more destination nodes) in the mesh network 112. In other words, scheduling of radio frames for different edge devices may be then done. If the management plane of the mesh network 112 is controlled by a scheduler of the first RAN node 108A (e.g., a small cell), then scheduling of switching events may be planned ahead of time and accordingly, switching may be done for an upcoming radio frame when a particular SFN or a sub-frame of a radio frame is detected (i.e., at frame level or even at sub-frame level). In order to achieve scheduling of the switching events, the processor 202 of the central cloud server 102 may be configured to provide an application programming interface (API) control to the RAN node (e.g., a small cell or a gNB like the first RAN node 108A) that can communicate to the central cloud server 102. In an implementation, by use of such API control, the first RAN node 108A (or the central cloud server 102 in coordination with the central cloud server 102 may then determine what to switch and where and when to execute one or more switching events (e.g., which beam to change or what beam pattern to use and when to use and change the beams and communication paths accordingly). The scheduler of the RAN node (e.g., the first RAN node 108A) may know exactly what data is meant for which UE when it is serving a set of UEs. Thus, the first RAN node 108A (i.e., particularly the scheduler of the first RAN node 108A or the central cloud server 102 in coordination with the first RAN node 108A) precisely knows what part of a radio frame, which UE has symbols for uplink and downlink communication, and thus, may be configured to control execution of switching events dynamically and very fast, for example, less than 100 milliseconds, to create a new communication path with a single hop or a multi hop scenario with mesh nodes of the mesh network 112 minimizing or avoiding disruption to a network channel. In other words, the scheduling can be controlled by the central cloud server 102, a RAN node (i.e., a small cell scheduler, for example, the first RAN node 108A), or the central cloud server 102 in coordination with the RAN node (e.g., the first RAN node 108A).

It is known and specified in 3G PP that a radio frame of a 5G NR frame structure may include ten sub-frames, where each sub-frame, includes one or more slots based on different configurations. In an example, a sub-frame may include one slot, where each slot may include 14 symbols (e.g., 14 OFDM symbols). In a case where a sub-frame has two slots, then the radio frame has 20 slots. Similarly, in a case where the sub-frame has four slots, then the radio frame has 40 slots, where the number of OFDM symbols within a slot is 14. It is also known that NR Time-division duplexing (TDD) uses a flexible slot configuration, where the flexible symbol can be configured either for uplink or for downlink transmissions. As the RAN node (e.g., the first RAN node 108A) or particularly, the scheduler of the first RAN node 108A knows frame numbers, performs scheduling and structures the data that is coming to a given radio frame or sub-frame, the RAN node (e.g., the first RAN node 108A) may send such radio frame to one edge device at one location, which can be hopped to another edge device (another mesh node) at another location until it reaches the destination node, such as the first UE 106A. Alternatively, the RAN node (e.g., the first RAN node 108A) may send one radio frame to one edge device at one location and another radio frame to another edge device (another mesh node) at another location or another frame to another location. This scheduling may be executed even sub-frame by sub-frame as the RAN node (e.g., the first RAN node 108A) knows symbol timings for the set of UEs it serves. In an implementation, such scheduling may be executed by the central cloud server 102 in coordination with the RAN node (e.g., the first RAN node 108A). This further saves power consumption at each edge devices of the plurality of edge devices 104 (i.e., mesh nodes of the mesh network 112) as antenna at each edge device may be momentarily used for communication and can go back to power save mode. Further, the switching of a beam to a given location may occur to serve one user (one UE) or a group of users (multiple UEs) at the given location, where the beam may carry only those SSB s meant for only one user or the group of users.

Figure 3:
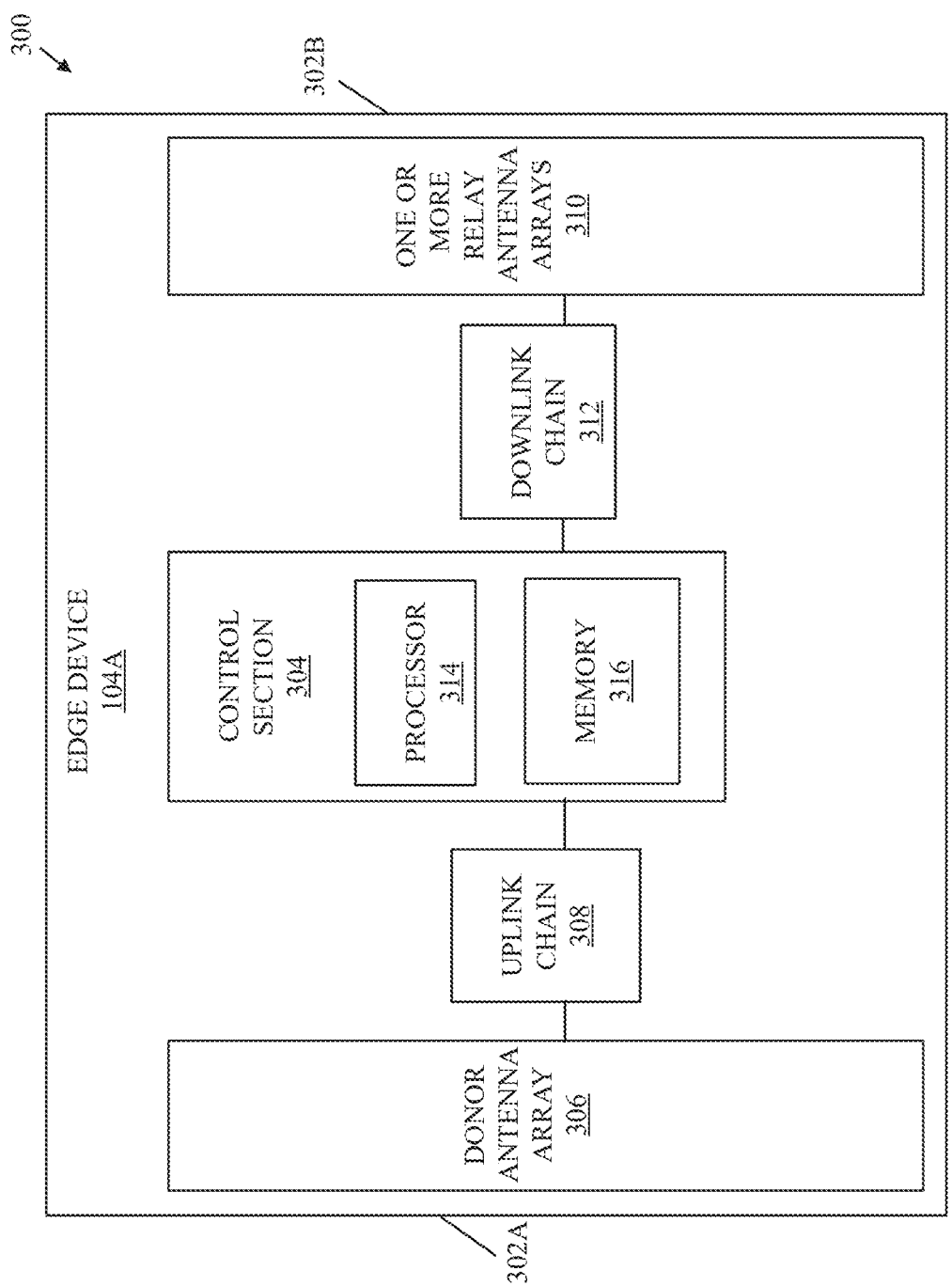
FIG. 3 is a block diagram illustrating different components of an exemplary edge device, in accordance with an embodiment of the disclosure.

FIG. 3 is a block diagram illustrating different components of an exemplary edge device, in accordance with an embodiment of the disclosure. FIG. 3 is explained in conjunction with elements from FIG. 1. With reference to FIG. 3, there is shown a block diagram 300 of a first edge device (i.e., the edge device 104A) with various components. The first edge device may be simply referred to as the edge device 104A. The edge device 104A is one of the plurality of edge devices 104 (FIG. 1). The edge device 104A has a donor side 302A facing toward the one or more RAN nodes 108, such as the first RAN node 108A (of FIG. 1). The edge device 104A also has a service side 302B facing toward the one or more UEs 106, such as the first UE 106A. In an implementation, the edge device 104A may include a control section 304 and a front-end radio frequency (RF) section, which may include the donor antenna array 306 and an uplink chain 308 at the donor side 302A, and further one or more service antenna arrays referred to as one or more relay antenna arrays 310 and a downlink chain 312 at the service side 302B. The control section 304 may be communicatively coupled to the front-end R F section, such as the one or more donor antenna arrays, such as the donor antenna array 306, the uplink chain 308, the one or more relay antenna arrays 310, and the downlink chain 312. The front-end RF section supports millimeter-wave (mmWave) communication as well communication at a sub 6 gigahertz (GHz) frequency. The control section 304 may further include processor 314 and a memory 316. In some implementation, the edge device 104A may further include a sensing radar and a radar data memory that are communicatively coupled to the processor 314 via a Serial Peripheral Interface (SPI) (not shown).

The edge device 104A includes suitable logic, circuitry, and interfaces that may be configured to communicate with the one or more RAN nodes 108 and the central cloud server 102. The edge device 104A may be further configured to communicate with the one or more UEs 106 and other edge devices of the plurality of edge devices 104. In accordance with an embodiment, the edge device 104A may support multiple and a wide range of frequency spectrum, for example, 3G, 4G, 5G, and 6G (including out-of-band frequencies). The edge device 104A may be at least one of an X G-enabled repeater device, an X G-enabled road-side unit (RSU), an X G-enabled relay device, an XG-enabled integrated CPE and repeater device, an XG-enabled vehicle-mounted edge device, where the term "X G" refers to 5G or 6G radio communication. Other examples of the edge device 104A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof deployed at a fixed location.

The donor antenna array 306 may be provided at the donor side 302A of the edge device 104A and may be coupled to an uplink chain 308. The one or more relay antenna arrays 310 may be provided at the service side 302B and may be coupled to the downlink chain 312. Each of the uplink chain 308 and the downlink chain 312 may include a transceiver chain, for example, a cascading receiver chain and a cascading transmitter chain, each of which comprises various components for baseband signal processing or digital signal processing. For example, the cascading receiver chain has various components, such as a set of low noise amplifiers (LNA), a set of receiver front end phase shifters, and a set of power combiners, for the signal reception (not shown here for brevity). Similarly, the cascading transmitter chain comprises various components for baseband signal processing or digital signal processing, such as a set of power dividers, a set of phase shifters, a set of power amplifiers (PA).

In an implementation, the one or more relay antenna arrays 310 at the service side 302B may be configured to execute mmWave communication with the one or more UEs 106 (including vehicles) within its communication range. In an implementation, the one or more relay antenna arrays 310 may also support multiple-input multiple-output (MIMO) operations and may be configured to execute MIMO communication with the one or more UEs 106 within its communication range. The MIMO communication may be executed at a sub 6 gigahertz (GHz) frequency or at mmWave frequency for 5G NR communication. Each of the donor antenna array 306 and the one or more relay antenna arrays 310 may be one of an X G phased-array antenna panel, an XG-enabled antenna chipset, an XG-enabled patch antenna array, or an XG-enabled servo-driven antenna array, where the "X G" refers to 5G or 6G. Examples of implementations of the X G phased-array antenna panel include, but are not limited to, a linear phased array antenna, a planar phased array antenna, a frequency scanning phased array antenna, a dynamic phased array antenna, and a passive phased array antenna.

The processor 314 may be communicatively coupled to the memory 316 and the front-end RF section. The processor 314 may be configured to execute various operations of the edge device 104A. The processor 314 may be configured to control various components of the front-end RF section, such as the donor antenna array 306 and the uplink chain 308 at the donor side 302A; and the one or more relay antenna arrays 310 and the downlink chain 312 at the service side 302B. The edge device 104A may be a programmable device, where the processor 314 may execute instructions stored in the memory 316. Examples of the implementation of the processor 314 may include but are not limited to an embedded processor, a baseband processor, a Field Programmable Gate Array (FPGA), a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 316 may be configured to store values calculated by the processor 314. Examples of the implementation of the memory 316 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the control section 304 may further include one or more other components, such as an analog to digital converter (ADC), a digital to analog (DAC) converter, a cellular modem, and the like, known in the art, which are omitted for brevity.

In operation, the processor 314 of the first edge device (i.e., the edge device 104A) may be configured to execute a discovery process (i.e., discovery operation). The discovery process may comprise determining location information of a plurality of neighboring nodes around the first edge device (i.e., the edge device 104A). In an example, the plurality of neighboring nodes may comprise at least one of: the two or more neighboring edge devices of the plurality of edge devices 104 or a combination of the two or more neighboring edge devices and one or more RAN nodes 108 including the first RAN node 108A. The discovery process may further comprise identifying a donor beam index from amongst a plurality of beam indexes for the donor antenna array 306 to establish a first communication link to a first neighboring node of the plurality of neighboring nodes. The discovery process may further comprise identifying one or more relay beam indexes from amongst the plurality of beam indexes for the one or more relay antenna arrays 310 to create one or more second communication links to one or more second neighboring nodes of the plurality of neighboring nodes. In the discovery process, it is to be discovered which beam index to select at both the donor side and the relay side of the first edge device (i.e., the edge device 104A). In order to identify which, beam index to select at both the donor side and the relay side of the first edge device, the processor 314 may be further configured to fire a plurality of different beams from the donor antenna array 306 and the one or more relay antenna arrays 310. The plurality of different beams may be fired by the donor antenna array 306 by selecting different beam indexes of a beam book at the donor antenna array 306. Similarly, the plurality of different beams may be fired by the one or more relay antenna arrays 310 by selecting different beam indexes of the beam book at the one or more relay antenna arrays 310. The processor 314 may be further configured to measure signal strength (e.g., SNR) of each fired beam by the donor antenna array 306 and the one or more relay antenna arrays 310. The plurality of different beams fired from the donor antenna array 306 may also be referred to as a plurality of first fired beams and the measured signal strength of each fired beams at the donor side of each edge device (e.g., at a neighboring node) may be referred to as a first beam measurement information. Similarly, the plurality of different beams fired from the one or more relay antenna arrays 310 may also be referred to as a plurality of second fired beams and the measured signal strength of each fired beams at the relay side of the first edge device may be referred to as a second beam measurement information. The donor beam index identified to be selected for the donor antenna array 306 may be the one having highest signal strength or a signal strength greater than a threshold and most suited to establish the first communication link with a corresponding upstream neighboring node (e.g., the first RAN node 108A or another upstream edge device). Similarly, the one or more relay beam indexes identified to be selected for the one or more relay antenna arrays 310 may be the one having highest signal strength or a signal strength greater than a threshold and most suited to establish a corresponding communication link with corresponding one or more downstream neighboring nodes (another edge devices or mesh nodes).

In an implementation, the plurality of edge devices 104 may comprise a root mesh node (e.g., the edge device 104A) communicatively coupled to the first RAN node 108A and a set of child mesh nodes (e.g., the edge devices 104B, 104C, and 104D) that are communicatively coupled directly or indirectly to the root mesh node in the mesh network 112. The root mesh node may be an edge device, such as the edge device 104A, of the plurality of edge devices 104 which may be in a suitable communication range to the first RAN node 108A (e.g., a small cell or a gNB) and/or may be directly linked to the first RAN node 108A. The first RAN node 108A may be a small cell or a gNB that may implement beam sweeping by changing beam direction for each synchronization signal block (SSB) transmission. It is to be understood that the number of different beams transmitted by the first RAN node 108A is determined by how many SSBs are being transmitted within a SSB Burst Set (e.g., a set of SSBs being transmitted in a 5 ms window of SSB transmission). Multiple SSBs may be transmitted at a certain interval, and each SSB can be identified by a unique number called SSB index (SSB index 0, 1, 2, 3, . . . , n). Moreover, each SSB is transmitted via a specific beam radiated in a certain direction, and each SSB index may be mapped to each beam. The root mesh node, for example, the edge device 104A, may be configured to measure the signal strength of each SSB it detected for a certain period (a period of one SSB Set) and may identify the SSB index with the strongest signal. Thus, the root mesh node, such as the edge device 104A, may be directly linked to the first RAN node 108A (e.g., a small cell or a gNB). The challenge for the root mesh node and the central cloud server 102 is how to reach to the one or more UEs 106 for uplink and downlink communication if there are some signal blockage regions, no direct line-of-sight, inadequate 5G cellular coverage and further, which edge devices to employ among the plurality of edge devices 104 to service the one or more UEs 106. In other words, it is a challenge how to increase coverage of the first RAN node 108A (e.g., a small cell or a gNB) for various indoor and outdoor applications without decreasing throughput and while maintaining the quality of service (QoS). Another challenge is how to ensure seamless connectivity as well as QoE without significantly increasing infrastructure costs even if there is a change in an environment causing sudden signal attenuation or signal blockage. The first edge device (i.e., the edge device 104A) and similarly other edge devices of the plurality of edge devices 104 in association with the central cloud server 102 achieves and overcomes one or more such technical challenge by dynamically forming the mesh network 112 and then smartly operating the mesh network 112 by executing switching events whenever there is a change in the environment to main service continuity.

Firstly, the processor 324 may be further configured to communicate, via the donor antenna array 306, a first donor beam in a first radiation pattern based on the identified donor beam index and the determined location information of the first neighboring node (e.g., the edge device 104B) to establish the first communication link to the first neighboring node. The processor 324 may be further configured to communicate, via the one or more relay antenna arrays 310, a first relay beam in a second radiation pattern and a second relay beam in a third radiation pattern to the one or more second neighboring nodes (e.g., the edge devices 104C and 104D) to establish one or more second communication links to the one or more second neighboring nodes. Similar to the first edge device, each of the plurality of edge devices 104 may also execute the discovery process, and lastly, establish one communication link to the upstream neighboring node and two communication links to two downstream neighboring nodes.

In accordance with an embodiment, the central cloud server 102 may assist the plurality of edge devices 104 to form the mesh network 112. The processor 314 may be further configured to communicate a plurality of sensed parameters 208 to the central cloud server 102 based on the discovery process at the first edge device (i.e., the edge device 104A), where the plurality of sensed parameters 208 may be associated with the donor antenna array 306 and the one or more relay antenna arrays 310. The central cloud server 102 is able to assist the plurality of edge devices 104 to form the mesh network 112 because like the first edge device (i.e., the edge device 104A), each of the plurality of edge devices 104 may be configured to communicate the plurality of sensed parameters 208 to the central cloud server 102 based on the discovery process. The plurality of sensed parameters 208 are assessed at each edge device (e.g., the first edge device) with respect to its corresponding two or more neighboring edge devices.

In an implementation, the plurality of sensed parameters 208 may be communicated periodically to the central cloud server 102. The plurality of sensed parameters 208 may comprise the first beam measurement information for the plurality of first fired beams by the donor antenna array 306, the second beam measurement information for the plurality of second fired beams by the one or more relay antenna arrays 310, location coordinates of the edge device 104A, location coordinates of the plurality of neighboring nodes around the edge device 104A, and a unique identifier of the edge device 104A. In some implementation, the plurality of sensed parameters 208 may further comprise corresponding unique identifiers of the plurality of neighboring nodes around the edge device 104A along with their location coordinates. The processor 314 may be further configured to obtain a plurality of path setup parameters 210 specific for the first edge device (i.e., the edge device 104A) from the central cloud server 102 in response to the communicated plurality of sensed parameters 208.

In an example, the plurality of path setup parameters 210 may comprise the unique identifier of the first edge device (e.g., the edge device 104A), location coordinates of the corresponding two or more neighboring edge devices to be connected by the first edge device (e.g., the edge device 104A), a donor beam index to be selected for the donor antenna array 306, and one or more relay beam indexes to be selected for the one or more relay antenna arrays 310 of the first edge device (e.g., the edge device 104A). The processor 314 may be further configured to establish a communication link to a corresponding upstream neighboring node of the plurality of neighboring nodes based on the obtained plurality of path setup parameters 210, for example, based on the donor beam index selected for the donor antenna array 306 and location information of the corresponding upstream neighboring node. The processor 314 may be further configured to fire a beam of RF signal from the donor antenna array 306 in a specific direction indicated by the selected donor beam index towards its corresponding upstream neighboring node in order to establish the first communication link to the corresponding upstream neighboring node. The processor 314 may be further configured to fire one or more beams of R F signals in one or more specific directions indicated by the selected one or more relay beam indexes towards the one or more corresponding downstream neighboring nodes from the one or more relay antenna arrays 310 in order to establish the one or more second communication links (e.g., two different communication links) with the one or more corresponding downstream neighboring nodes (e.g., two different downstream neighboring nodes). Alternatively, the processor 314 may be further configured to establish one or more second communication links to one or more corresponding downstream neighboring nodes of the plurality of neighboring nodes based on the one or more relay beam indexes selected for the one or more relay antenna arrays 310 as well as the location information of each of the one or more corresponding downstream neighboring nodes. Alternatively, the processor 314 may be further configured to fire one or more beams of R F signals from the one or more relay antenna arrays 310 in one or more specific directions indicated by the identified one or more relay beam indexes towards the one or more corresponding downstream neighboring nodes in one or more radiation patterns depending on a corresponding distance of the edge device 104A from the one or more corresponding downstream neighboring nodes in order to establish the one or more communication links. The establishment of the first communication link to the corresponding upstream neighboring node of the first edge device (e.g., the edge device 104A) and further establishment of the one or more second communication links (e.g., two communication links) to the one or more corresponding downstream neighboring nodes (e.g., at least two mesh nodes) may be used as a building block to create a mesh network 112 of the plurality of edge devices 104 such that a spatial coverage of at least a first RAN node 108A may be increased to serve one or more UEs 106 via the mesh network 112 with a throughput rate greater than a threshold. In other words, similar to the edge device 104A, other edge devices of the plurality of edge devices 104 may operate similarly to create the mesh network 112 of the plurality of edge devices 104 under the control of the central cloud server 102. In some implementation, the root mesh node that is connected to the first RAN node 108A may control other child mesh nodes (i.e., other edge devices of the plurality of edge devices 104) to form the mesh network 112 under the control of the central cloud server 102.

The central cloud server 102 may be further be configured to cause the first set of edge devices (e.g., the edge devices 104A and 104D) to establish a determined primary communication path to service the one or more UEs 106 for uplink and downlink communication. The primary communication path may be established based on the communicated path setup parameters specific to each of the first set of edge devices (e.g., the edge devices 104A and 104D).

In certain scenarios, there may be a change in a surrounding environment that may affect signal quality and cause either signal attenuation or signal blockage at one or more mesh nodes that form the primary communication path, thereby may potentially affect the primary communication path. In such a case, the processor 314 may be further configured to obtain timing information at a first time instant from a RAN node (e.g., the first RAN node 108A) or the central cloud server 102. The timing information may be indicative of a unique SFN or a sub-frame of the unique SFN that is to be received at the first edge device (i.e., the edge device 104A). The processor 314 may be further configured to detect the unique SFN or the sub-frame of the unique SFN at a second time instant. In an example, the timing information may be obtained from the central cloud server 102 or the RAN node (e.g., the first RAN node 108A) ahead-of-time (i.e., at the first time instant before actual SFN or sub-frame of SFN is obtained and detected at the first edge device) indicating that the unique SFN or the sub-frame of the SFN may be upcoming and that when the unique SFN or the sub-frame of the unique SFN will be detected, the first edge device (i.e., the edge device 104A) is expected to select a new beam index and change a beam pattern to establish a new communication path by executing a switching event.

Based on the detection of the unique SFN or the sub-frame of the unique SFN at the second time instant, the processor 314 may be further configured to execute a switching event at the first edge device (i.e., the edge device 104A) in which a new communication link is established with a second edge device (e.g., the edge device 104B) neighboring the first edge device (i.e., the edge device 104A). The new communication link established between the first edge device (i.e., the edge device 104A) and the second edge device (e.g., the edge device 104B) may correspond to a change triggered in a mesh network 112 to maintain a continuity in uplink and downlink communication between one or more UEs 106 and the RAN node (e.g., the first RAN node 108A) via the mesh network 112 (i.e., via an alternative path different from the primary communication path formed as a result of the new communication link). Alternatively stated, a management plane may be used to obtain the timing information (i.e., precise timings) ahead-of-time indicating that a frame number "I" ($SFN_i$), say a particular SFN, is upcoming and that when the first edge device (i.e., the edge device 104A) and the second edge device (e.g., the edge device 104B) detects such $SFN_i$, both of the first edge device (i.e., the edge device 104A) and the second edge device (e.g., the edge device 104B) are expected to switch in a certain way (e.g., select a new beam index and change beam patterns for the first edge device (i.e., the edge device 104A) and the second edge device (e.g., the edge device 104B) in the mesh network 112 to create the new communication link so that it is less disruptive for network and a continuity of uplink and downlink communication can be achieved improving the quality of service (QoS).

The processor 202 of the central cloud server 102 (independently or in coordination with the first RAN node 108A) may be configured to send a command to the two mesh nodes A and B (i.e., the first edge device and the second edge device) that at $SFN_{1000}$, or a particular sub-frame of the $SFN_{100}$, switching is to be executed and the beam pattern is to be changed from X to Y. Such SFN, say $SFN_{1000}$, communicated is unique across the whole network (the cellular network including the mesh network 112). This helps to establish the new communication link between the first edge device (i.e., the edge device 104A) and the second edge device (e.g., the edge device 104B), where a new edge device in the mesh network 112 (e.g., the second edge device) may be a new mesh node (e.g., the edge device 104B) not included in the first set of edge devices (e.g., the edge devices 104A and 104D) but used now to create the alternative path within a threshold time (within a few milliseconds, for example, less than 50-100 milliseconds). The new communication link may be a part of a communication path (i.e., the alternate path) between the RAN node (e.g., the first RAN node 108A) and the one or more UEs 106 established via a set of edge devices (e.g., a new set of edge devices that now include the second edge device), where the set of edge devices may comprise at least the first edge device (i.e., the edge device 104A) and the second edge device (e.g., the edge device 104B.

In accordance with an embodiment, the switching event may be executed by the processor 314 at the time when a certain radio frame is encountered where there is null or no symbols in order to not disrupt a communication channel. In order to do that, the unique SFN or the sub-frame of the unique SFN may be decoded as part of a given SSB, where the mesh nodes, such as the first edge device and the second edge device, may be time aligned. For example, the central cloud server 102 (or the first RAN node 108A) may be configured to communicate a command to two mesh nodes A and B, such as the first edge device and the second edge device, to change their communication links and beams for next cycle to create the new communication link, thereby creating a new communication path. Simply stated, the timing information indicates when to do that switching to the new communication link in order to be synchronized.

In an implementation, the switching event may be executed to create the new communication link and may not be hoping event among multiple mesh nodes to create a new route or end to end path. However, if the central cloud server 102 (or the first RAN node 108A) has a table, such as a reachability table, and it is known by the central cloud server 102 (or the RAN node, such as the first RAN node 108A) ahead-of-time what data to send in which frame, then such SFN or a sub-frame may be used to create the new communication path between the source node (e.g., the first RAN node 108A) and one or more destination nodes (e.g., the one or more UEs 106) via the change (i.e., newly created communication path that hops among multiple mesh nodes to reach the one or more destination nodes) in the mesh network 112. In other words, scheduling of radio frames for different edge devices may be then done. If the management plane of the mesh network 112 is controlled by a scheduler of the first RAN node 108A (e.g., a small cell), then scheduling of switching events may be planned ahead-of-time and accordingly switching may be done for an upcoming radio frame when a particular SFN or a sub-frame of a radio frame is detected (i.e., at frame level or even at sub-frame level).

In an implementation, the switching event may be executed via a management plane of the mesh network 112, where the switching event may be controlled by the central cloud server 102. In another implementation, the switching event may be executed via a management plane of the mesh network, where the switching event may be controlled by a scheduler of the RAN node (e.g., the first RAN node 108A). In an implementation, the switching event may be executed via a management plane of the mesh network 112, where the switching event may be controlled by the central cloud server 102 in coordination with the RAN node (e.g., the first RAN node 108A).

In accordance with an embodiment, the processor 314 may be further configured to periodically check whether the new communication link has a signal strength greater than a threshold to maintain the continuity in the uplink and downlink communication between the one or more UEs 106 and the RAN node (e.g., the first RAN node 108A) via the mesh network 112. The one or more UEs 106 may be served previously by one of the first set of edge devices (e.g., the edge device 104D), which may then be replaced by new mesh node, i.e., the second edge device (e.g., the edge device 104B). In a case where the new communication link has a signal strength less than a threshold, another new communication link may be established by execution of another switching event.

In accordance with an embodiment, one of plurality of edge devices 104 may be configured as a master mesh node, where the master mesh node may be configured to directly connect to a gNB and other slave mesh nodes under the control of the master mesh node form a self-organizing mesh network, such as a self-organizing 5G mesh network. Since the master mesh node and all the slave mesh nodes may have cloud connectivity (i.e., connected to the central cloud server 102), election of beams of R F signals (i.e., 5G beams) to serve as a connection may be dynamic and may adapt to changing environment, such as a sudden signal blockage. In an implementation, these self-organizing mesh network connections may be driven autonomously at each edge device of the plurality of edge devices 104 without requiring cloud connectivity all the time, such as in a survivability mode. However, when a connectivity to the cloud, i.e., the central cloud server 102 is present, such mesh connections may be over-ridden from the central cloud server 102.

Figure 4:
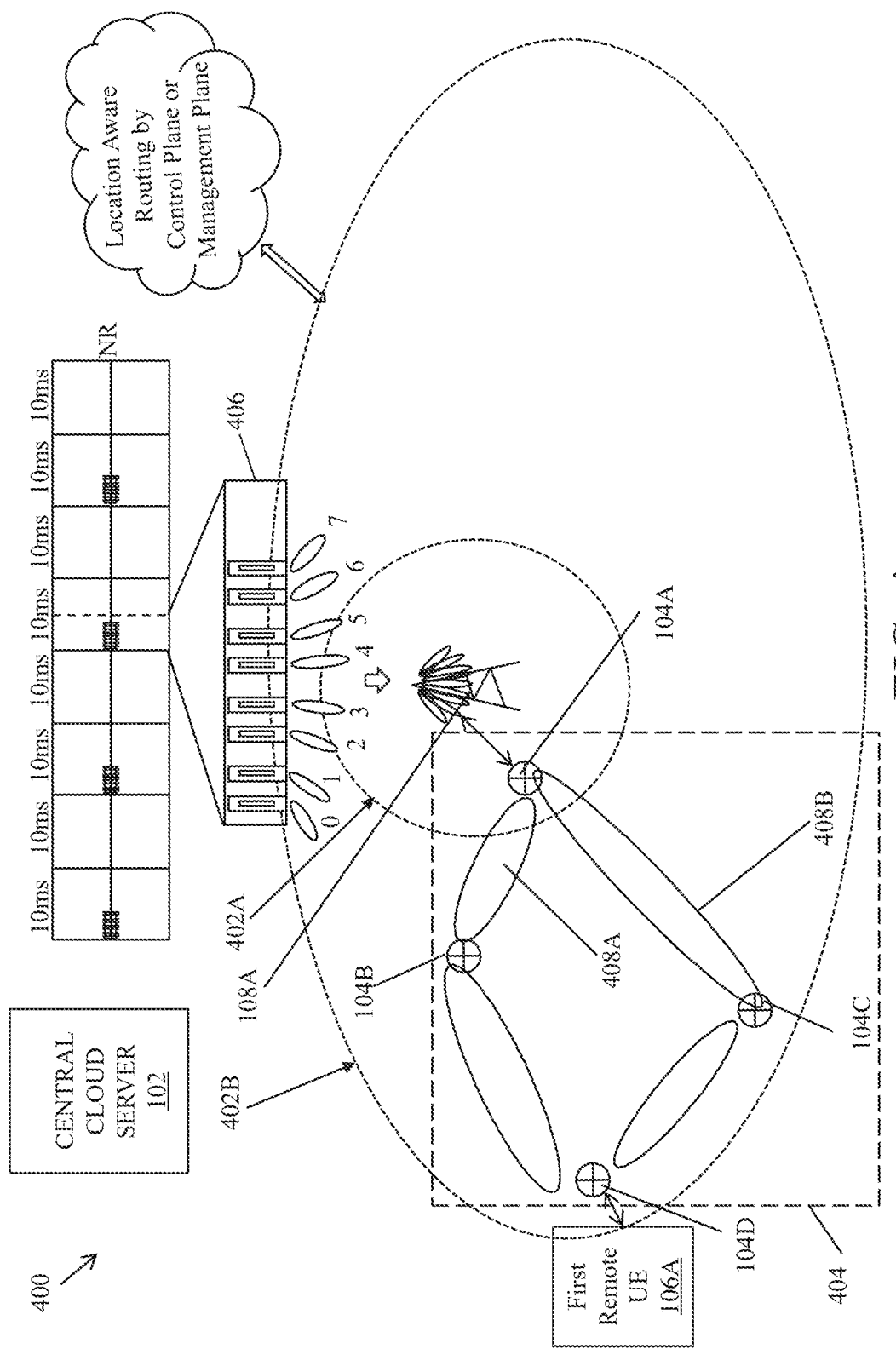
FIG. 4 is a diagram of an exemplary scenario for implementation of the communication system and method for operating a 5G mesh network for service continuity, in accordance with an embodiment of the disclosure.

FIG. 4 is a diagram of an exemplary scenario for implementation of the communication system and method for operating a 5G mesh network for enhancing 5G cellular coverage to overcome signal blockage regions for ultra-reliable high-performance communication, in accordance with an embodiment of the disclosure. FIG. 4 is explained in conjunction with elements from FIGS. 1 to 3. With reference to FIG. 4, there is shown an exemplary scenario 400 that includes the central cloud server 102 and the edge devices 104A, 104B, 104C, and 104D. In the exemplary scenario 400, there is further shown a first RAN node 108A (e.g., a small cell or a base station, such as a gNB) having an initial coverage 402A. The initial coverage 402A of the first RAN node 108A may be enhanced (i.e., an enhanced coverage 402B) using a plurality of edge devices, such as the edge devices 104A, 104B, 104C, and 104D, that forms the mesh network 404 (e.g., a 5G mesh network). There is further shown the first UE 106A communicatively coupled to the edge device 104D.

In the exemplary scenario 400, the processor 202 of the central cloud server 102 may be configured to cause each of the plurality of edge devices, such as the edge devices 104A, 104B, 104C, and 104D, to initiate a discovery process. Each edge device (i.e., each mesh node of the mesh network 404) of the edge devices 104A, 104B, 104C, and 104D may comprise one donor antenna array (such as the donor antenna array 306) and two relay antenna arrays (such as the one or more relay antenna arrays 310). In case of indoor deployment, each edge device may further include Wi-Fi capability, which may be used, for example, to determine its location coordinates or location coordinates of neighboring mesh nodes (e.g., nearby edge devices implemented as mesh nodes) by indoor received signal strength indication (RSSI)-based triangulation. In some implementation, each edge device may further include a position sensor or a location sensor (such as a gyroscope or a global positioning system (GPS) for outdoor localization (i.e., to determine its location coordinates).

In accordance with an embodiment, each edge device may be configured to execute the discovery process. In an implementation, the discovery process may be initiated based on an initiate command received from the central cloud server 102. The discovery process may also be referred to as a discovery protocol or a discovery operation. The discovery process comprises determining location information of a plurality of neighboring nodes. For example, the edge device 104C may determine its location and also the location of the neighboring nodes, such as other nearby edge devices 104A, 104B, and 104D. Such location coordinates determined via position or location sensor or via Wi-Fi-based triangulation may be communicated to the central cloud server 102. In an implementation, at the time of deployment of the edge devices 104A, 104B, 104C, and 104D, a location of such edge device may be uploaded to the central cloud server 102 along with an identity of the corresponding edge device. Location coordinates may be determined by any other known methods of location estimation, such as a triangulation method, using sounding waves, using sensors, Radar, BLUETOOTH™, RSSI from client etc. The discovery of the location of mesh nodes may be done by any methods known in the art.

In an implementation, the plurality of edge devices, such as edge devices 104A, 104B, 104C, and 104D, may be deployed strategically at different locations to increase coverage and overcome signal blockage so that a beam of RF signal can reach a location previously not reachable. For example, at nooks and corners of a building of an enterprise, behind a building, inside the building at different locations to overcome blockages and at least to create a line-of-sight path with two neighboring nodes. In an example, the plurality of edge devices, such as edge devices 104A, 104B, 104C, and 104D, may be deployed as a private mesh network created for an enterprise. Typically, inter distances among the plurality of edge devices (i.e., the mesh nodes) deployed indoors in an enterprise may be 60-90 meters or 70-80 meters. In another example, the plurality of edge devices, such as edge devices 104A, 104B, 104C, and 104D, may be deployed as a public network or a combination of public and private mesh networks for end-users.

In accordance with an embodiment, the discovery process may further comprise identifying a donor beam index from amongst a plurality of beam indexes for the donor antenna array (e.g., the donor antenna array 306) to establish a communication link to a first neighboring node of the plurality of neighboring nodes. Similarly, the discovery process may further comprise identifying one or more relay beam indexes from amongst the plurality of beam indexes for the two relay antenna arrays (e.g., the one or more relay antenna arrays 310) to create one or more communication links to one or more second neighboring nodes of the plurality of neighboring nodes.

In an example, a root mesh node, such as the edge device 104A, may be directly linked to the first RAN node 108A (e.g., a small cell or a gNB), as shown. In this case, in the exemplary scenario 400, there is further shown a signal synchronization Block (SSB) set transmission, which may be a time-domain transmission pattern of SSB in New radio (NR) 5G. Unlike in LTE, in the NR, there are many different cases of the Time Domain pattern of SSB Transmission. NR SSB may be transmitted in various different patterns depending on subcarrier spacing, frequency range, and some other parameters. A given SSB may be considered as a small package sitting in an NR radio frame, where each SSB may include a primary synchronization signal (PSS), a secondary synchronization signal (SSS), a Physical Broadcast Channel (PBCH), and a physical layer signal known as "DeModulation Reference Signal (DMRS)", which functions as a reference signal for decoding PBCH. All these components are allocated in an SSB resource grid as specified in the 3GPP specification for NR 5G. In the exemplary scenario 400, the first RAN node 108A may be a small cell that may implement beam sweeping by changing beam direction for each SSB transmission. It is to be understood that the number of different beams transmitted by the first RAN node 108A is determined by how many SSBs are being transmitted within an SSB Burst Set 406 (a set of SSBs being transmitted in 5 milliseconds (ms) window of SSB transmission). In this case, there are eight SSBs transmitted within the SSB burst set 406 indexed as 0-7. Alternatively stated, multiple SSBs may be transmitted with a certain interval, and each SSB can be identified by a unique number called SSB index (SSB index 0, 1, 2, 3, 4, 5, 6, and 7 as shown in this case). Moreover, each SSB is transmitted via a specific beam radiated in a certain direction by the first RAN node 108A (represented by beams in different directions) in an example. In other words, each SSB index may be mapped to each beam. The parameter that defines the maximum number of SSBs within an SSB set is called Lmax. In sub 6 GHz, Lmax is 4 or 8, and in mmWave, Lmax is 64. In other words, in sub 6 GHz, max 4 or 8 different beams can be used, and they sweep in one dimension (horizontal only or vertical only). In mmWave max, 64 different beams can be used, and they can sweep in two dimensions (horizontal and vertical directions).

In this case, the root mesh node, i.e., the edge device 104A, may be configured to measure the signal strength of each SSB it detected for a certain period (a period of one SSB Set) and may identify the SSB index with the strongest signal (e.g., the SSB A, for example, for SSB index 1 which corresponds to second beam—beam #1). Thus, the root mesh node, such as the edge device 104A, may be directly linked to the first RAN node 108A (e.g., a small cell or a gNB), as shown. Moreover, each edge device may include three radio interfaces (one donor antenna array and two relay antenna arrays). Thus, two communication links (or two communication paths) may be established from the two relay antenna arrays. Similarly, one communication link (or one communication path) may be created from the donor side for upstream communication. In the edge device 104A, which beam to activate from the two relays (i.e., the two relay antenna arrays) may not be known yet. This needs to be discovered in the discovery process. In other words, it may be required to discover which beam index to select for an appropriate communication link (or path). So, there is an initial discovery process in which two relay beam indexes (e.g., beam index #43 and beam index #51) may be identified from amongst the plurality of beam indexes (e.g., 0-57 beam indexes; 0-63 beam indexes etc.) for the one or more relay antenna arrays to create two communication links 408A and 408B to two second neighboring nodes (i.e., the edge devices 104B and 104C) of the plurality of neighboring nodes.

In accordance with an alternative embodiment, the R F signal from the first RAN node 108A may be received in a first frequency by the root mesh node, such as the edge device 104A. The root mesh node, such as the edge device 104A, may be configured to convert the R F signal in the first frequency (may also be referred to as a source frequency) to a second frequency (may also be referred to as a dedicated mesh network frequency) that is different from the first frequency. Thereafter, the inter-communication among the edge devices, such as the edge device 104A to another edge device, such as the edge device 104B, in the mesh network 112 may be in a second frequency, such as in an industrial, scientific and medical (ISM) band, or another dedicated privately licensed band or a dedicated 60 GHz band, and then further converted back to the first frequency (i.e., source frequency of the first RAN node 108A) when communicated to a destination node, such as the one or more UEs 106. In an implementation, the source frequency (i.e., the first frequency) may be a sub 6 GHz frequency whereas the frequency used in the mesh network among the edge devices may be an ISM band frequency, a mmWave frequency, or a frequency different from the first frequency (e.g., RAN NODE—FR1—to Repeater1 (i.e., one edge device)—ISM band—to Repeater2 (i.e., another edge device)—FR1—to UE).

Figure 5:
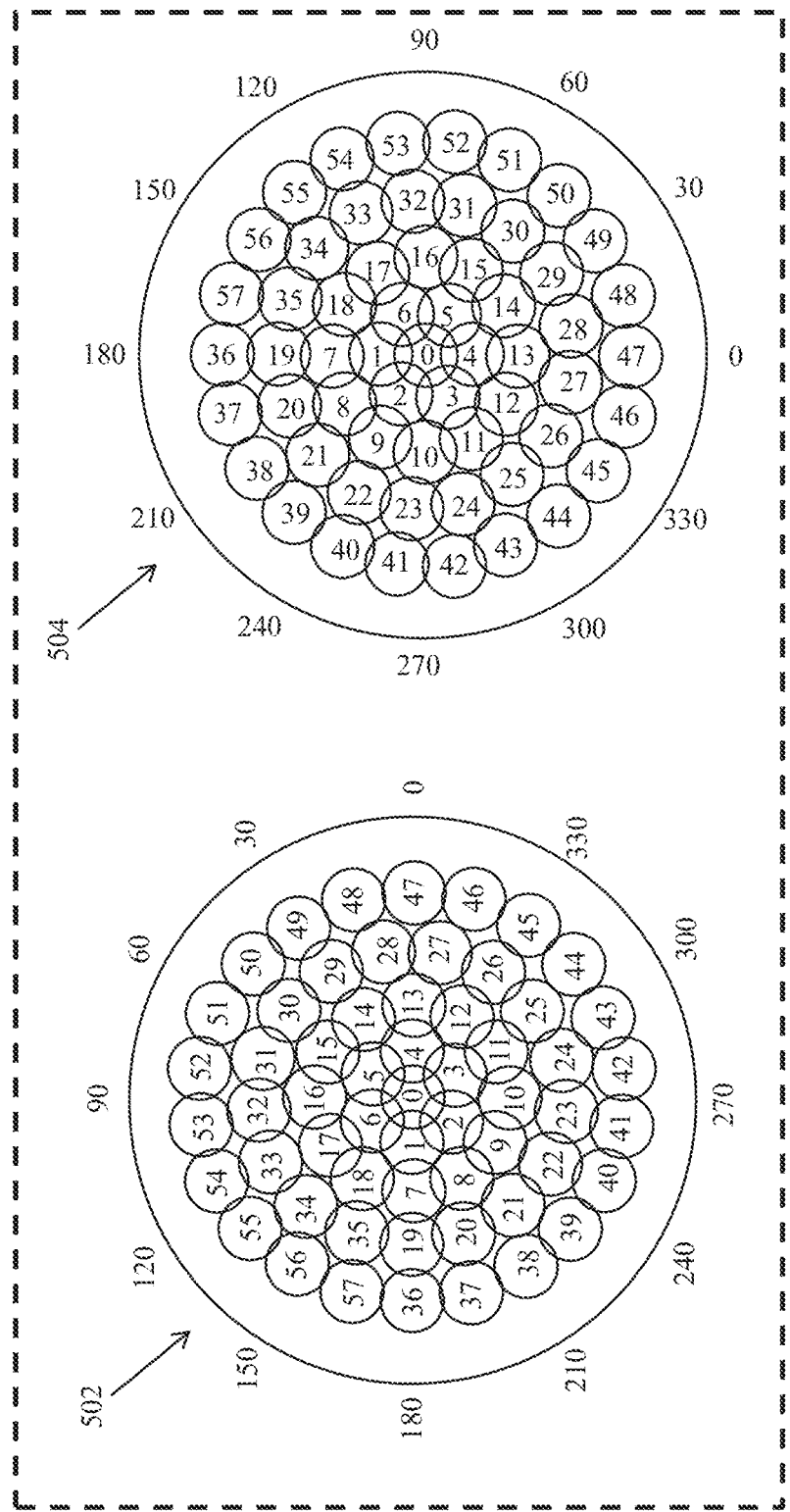
FIG. 5 is a diagram that illustrates beam indexes in a gum-stick representation, in accordance with an embodiment of the disclosure.

FIG. 5 is a diagram that illustrates beam indexes in a gum-stick representation, in accordance with an embodiment of the disclosure. FIG. 5 is explained in conjunction with elements from FIGS. 1 to 4. With reference to FIG. 5, there is shown a first plurality of beam indexes arranged in a vertical direction depicted by a first gum-stick representation 502. There is also shown a second plurality of beam indexes arranged in a horizontal direction (horizontal with respect to the surface of ground plane) depicted by a second gum-stick representation 504. When the gum-sticks are placed vertically, those gum-sticks represent a beam book index (like the first gum-stick representation 502). At each edge device of the plurality of edge devices 104, such as the edge devices 104A, 104B, 104C, and 104D, the typical beam book index may be rotated 90 degrees to obtain the arrangement of beam indexes as shown, for example, in the second plurality of beam indexes arranged in a horizontal direction (e.g., like the second gum-stick representation 504). Such beam indexes (i.e., gum-sticks) are mapped horizontally at the donor antenna array 306 and the two relays, i.e., the one or more relay antenna arrays 310. Typically, by default, a boresight beam (index 0 in the middle) may be selected, but in the present disclosure, the selection of the beam index is based on the location information (i.e., location coordinates) of the next mesh point, i.e., neighboring edge device. Thus, based on such identification of the best-suited beam indexes, the edge device 104A may be configured to select and fire two beams with beam index #43 and beam index #53 in two different directions specifically towards the edge device 104B and 104C, which ends up creating connections, i.e., two communication links 408A and 408B (shown in FIG. 4). This is further explained, for example, in FIG. 6.

Figure 6:
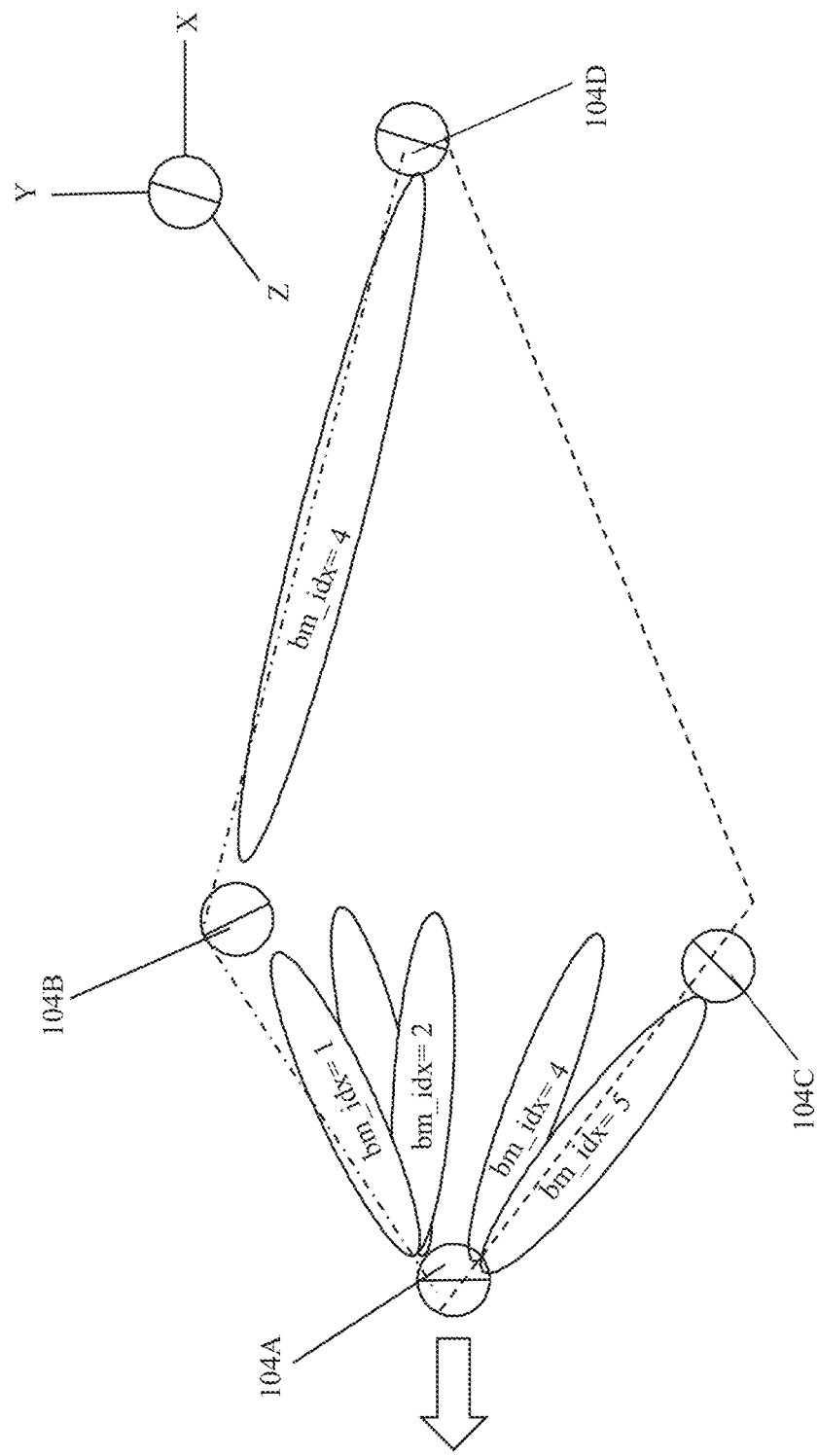
FIG. 6 is a diagram that illustrates beam mapping and path learning by the central cloud sever, in accordance with an embodiment of the disclosure.

FIG. 6 is a diagram that illustrates beam mapping and path learning by the central cloud sever, in accordance with an embodiment of the disclosure. FIG. 6 is explained in conjunction with elements from FIGS. 1 to 5. With reference to FIG. 6, there is shown an exemplary mesh network of four mesh nodes, such as the edge devices 104A, 104B, 104C, and 104D, to explain the beam mapping and path learning in the initial discovery process. As it is to be discovered which beam index to select for appropriate communication link (or communication path), each relay antenna array of the two relay antenna arrays (i.e., the one or more relay antenna arrays 310) may be configured to fire a plurality of different beams by selecting different beam indexes, for example, beam indexes represented by gum-sticks in the second gum-stick representation 504 (FIG. 5) and measure the Equivalent Isotropic Radiated Power (EIRP) or RSSI of each fired beam. It is observed that there is almost 6 decibels (dB) difference (or drop) between two extremes, such as beam indexes #43 and #51. It is further observed that a 6 dB difference is enough to substantially increase or decrease the data throughput rate. In some cases, it was observed that the throughput increased from 1 GB to 2.4 GB by a selection of appropriate beam index. Thus, it is initially identified which are the right beams indexes to be selected, and it may be determined by finding a heading vector. For example, say using two determined location coordinates of two mesh nodes, the heading vector may be found. However, the firing of beams and collecting of measurement data (e.g., EIRP, RSSI, etc.), may still be executed in the backend. This backend scanning may be executed as there may be some reflective objects or reflective paths at some locations or due to dynamic nature of the environment, one of the previously identified beam index and corresponding beam may become weaker or some other beams may become stronger. Thus, a periodic discovery is performed at each edge device (i.e., each mesh node) to cater to such change in reflective paths. Such path(s) may be kept ready as backup or alternative paths, which may be fallback options. In other words, when a primary path is broken, a secondary path is activated. By use of the discovery process, each edge device may be configured to exchange information with the central cloud server 102.

In an implementation, a link state protocol, such as an Open Shortest Path First (OSPF) algorithm, may be used, which runs on each edge device of the edge devices 104A, 104B, 104C, and 104D (i.e., each mesh node of the mesh network 404) and sends such information to the central cloud server 102. Alternatively stated, the central cloud server 102 may be configured to obtain a plurality of sensed parameters 208 from each edge device of the plurality of edge devices 104, such as the edge devices 104A, 104B, 104C, and 104D, based on the discovery process at each edge device of the plurality of edge devices. Such plurality of sensed parameters 208 are associated with the donor antenna array (e.g., beam measurements for fired beams for different beam indexes at the donor antenna array 306) and the one or more relay antenna arrays 310 (e.g., beam measurements for fired beams for different beam indexes at the two relays) of each edge device. The plurality of sensed parameters 208 may be assessed at each edge device with respect to its corresponding two or more neighboring network nodes. The plurality of sensed parameters 208 may comprise its location coordinates and measurement data. Further, as beam adjustments are taking place on a periodic basis and backend processing runs periodically, the plurality of sensed parameters 208 may be periodically obtained from the plurality of edge devices 104, such as the edge devices 104A, 104B, 104C, and 104D.

The central cloud server 102 may be further configured to determine a plurality of path setup parameters 210 specific for each edge device of the plurality of edge devices 104 based on the obtained plurality of sensed parameters 208 from each edge device of the plurality of edge devices 104. The path setup parameters may be stored in reachability tables 212 for upstream and downstream communication. An example of the reachability tables 212 is shown and described, for example, in FIG. 7. The central cloud server 102 may be further configured to communicate the plurality of path setup parameters 210 determined specifically for each edge device, to each corresponding edge device of the plurality of edge devices 104. Based on the communicated plurality of path setup parameters 210 to each corresponding edge device of the plurality of edge devices 104, the central cloud server 102 may be further configured to cause the plurality of edge devices 104 to form the mesh network 404 such that a spatial coverage (e.g., the initial coverage 402A) of at least a RAN node, such as the first RAN node 108A, may is increased to serve one or more UEs, such as the first UE 106A (previously unreachable due to signal blockage), which are stationary or in motion via the mesh network 404 with a throughput rate greater than a threshold, for example, in a multi-gigabit throughput rate. The parameters that define a communication link (such as the communication links 408A and 408B) may be <relay number, location coordinates (e.g., IMU-Gyroscope/GPS-xyz coordinates), near end relay beam book IDx, far end donor beam IDx>, where relay_set_beambook_index (intbm_idx), i.e., beam indexes that are identified at most suited for each edge device during the discovery process are set at the corresponding edge device. Each edge device, for example, a first edge device (i.e., the edge device 104A) may be configured to communicate, via the donor antenna array 306, a first donor beam in a first radiation pattern based on the determined donor beam index and the location information of the first neighboring node (e.g., the first RAN node 108A or a neighboring mesh node) to establish the communication link to the first neighboring node. Each edge device, for example, a first edge device (i.e., the edge device 104A) may be further configured to communicate, via the one or more relay antenna arrays 310, a first relay beam in a second radiation pattern and a second relay beam in a third radiation pattern to the one or more second neighboring nodes (e.g., the edge devices 104B and 104C) to establish one or more second communication links (e.g., the communication links 408A and 408B) to the one or more second neighboring nodes (e.g., the edge devices 104B and 104C).

FIG. 7 is a diagram that illustrates reachability tables for upstream and downstream communication generated by the central cloud server, in accordance with an embodiment of the disclosure. FIG. 7 is explained in conjunction with elements from FIGS. 1 to 6. With reference to FIG. 7, there is shown a first reachability table 702 for downstream and a second reachability table 704 for upstream. Based on the obtained plurality of sensed parameters 208 from each edge device of the plurality of edge devices 104, the central cloud server 102 may be further configured to determine the plurality of path setup parameters 210 specific for each edge device of the plurality of edge devices 104 and store such path set parameters as corresponding path tags, simply referred to as tags, in the reachability tables (e.g., the first reachability table 702 for downstream and the second reachability table 704 for upstream), where each tag defines a communication link, and one or multiple communication links together may establish a communication path (i.e., a route or a communication path taken from a source node (e.g., the first RAN node 108A) to reach a destination node (e.g., the first UE 106A) and vice versa via the mesh network 404). Each tag comprises path set up parameters defined in a given corresponding row. For example, "tag-d1" may comprise one path setup parameters corresponding to relay 1 (e.g., one edge device).

In this case, the downstream may refer to what a given edge device may be looking to relay down to its next mesh point (i.e., neighboring edge device or neighboring node). The upstream may be defined from a perspective of communication from the donor side of each edge device (i.e., towards its upstream neighboring node). In some implementation, unlike the use of the radio parameters as one of the path setup parameters for the upstream, such radio parameters may not be considered in the downstream is because each edge device simply inherits and relays whatever radio parameters are present on the donor side of each edge device. For example, radio parameters of the donor antenna array may be automatically inherited, meaning if the frequency of 28 GHz or 39 GHz, or sync path gain parameter are applied to the donor side (i.e., at the donor antenna array), and once these radio parameters are established, then the relay side doesn't need to carry that extra data of radio parameters on the downstream side of each edge device, as it may be simply inherited or replicated at the two relays (i.e., the one or more relay antenna arrays 310). In some alternative implementations, each edge device may not inherit and relay whatever radio parameters are present on the donor side of each edge device. For example, a frequency (F1) received at the donor side may be upconverted or down-converted to a different frequency (F2) as per the need for ultra-reliable high-performance communication.

In an implementation, each edge device (i.e., mesh node) may be configured to update the central cloud server 102, for example, via a "Hello" protocol to update the reachability tables, such as the first reachability table 702 for downstream and the second reachability table 704 for upstream. Each edge device (i.e., mesh node) may look for a "hello"

protocol which may be mapped to OSPF. As described in FIG. 6, a link-state protocol, such as the OSPF algorithm, may be used, which runs on each edge device (i.e., each mesh node of the mesh network 404) and periodically sends information, such as <relay ID>, <location coordinates>, for example, information of upstream and downstream neighboring nodes, <donor beam index>, relay beam index, any change in beam information or beam indexes, to the central cloud server 102. The central cloud server 102 may be configured to determine spatially where the mesh points are (i.e., location of edge devices with respect to each other spatially in a geographical area), determines path setup parameters and complete end-to-end communication paths between source and destination nodes and dynamically connects some mesh nodes that act as intermediate nodes between the source and destination nodes to facilitate upstream and downstream communication between such source (e.g., the first RAN node 108A) and destination nodes (e.g., the first UE 106A).

In accordance with an embodiment, the central cloud server 102 may be further configured to determine a primary communication path between the first RAN node 108A and one or more UEs 106 (e.g., the first UE 106A) via a first set of edge devices (e.g., the edge devices 104A, 104B, and 104D) of the plurality of edge devices 104, where each edge device of the plurality of edge devices 104 is configured as a mesh node of the mesh network 404. Similarly, the central cloud server 102 may be further configured to determine one or more secondary communication paths between the first RAN node 108A and the one or more UEs 106 via a second set of edge devices (e.g., the edge devices 104A, 104C, and 104D) of the plurality of edge devices. The central cloud server 102 may be further configured to cause the first set of edge devices (e.g., the edge devices 104A, 104B, and 104D) to establish the determined primary communication path to service the one or more UEs 106 (e.g., the first UE 106A) for uplink and downlink communication. The primary communication path may be established based on the communicated path setup parameters specific to each of the first set of edge devices (e.g., the edge devices 104A, 104B, and 104D). A beam routing controller (e.g., the processor 202) of the central cloud server 102 may send the path setup parameters to each mesh point, such as the first set of edge devices (e.g., the edge devices 104A, 104B, and 104D). However, in case of a signal blockage due to obstructions or movement of the first UE 106A or any other change in the environment (e.g., a repeater device or the first UE 106A being served changed its position), the central cloud server 102 may be further configured to dynamically switch from the primary communication path to the determined one or more secondary communication paths within a threshold time (e.g., less than 100 milliseconds) based on a presence of a signal obstruction in the primary communication path to maintain continuity in the service to the one or more UEs 106 for the uplink and downlink communication. The signal blockage or the presence of a signal obstruction in the primary communication path may be known to the central cloud server 102 based on the periodic information received from at least each of the participating edge devices, i.e., the first set of edge devices (e.g., the edge devices 104A and 104D) that are used to form the primary communication path. Thus, the primary communication path may be made dormant, and the secondary communication path may be made active. The path recovery may be autonomously triggered locally at the concerned edge device (e.g., the edge device 104B) or may be directed from the central cloud server 102. In an implementation, the switching event may be executed via a management plane of the mesh network 404, where the switching event may be controlled by the central cloud server 102.

Figure 8:
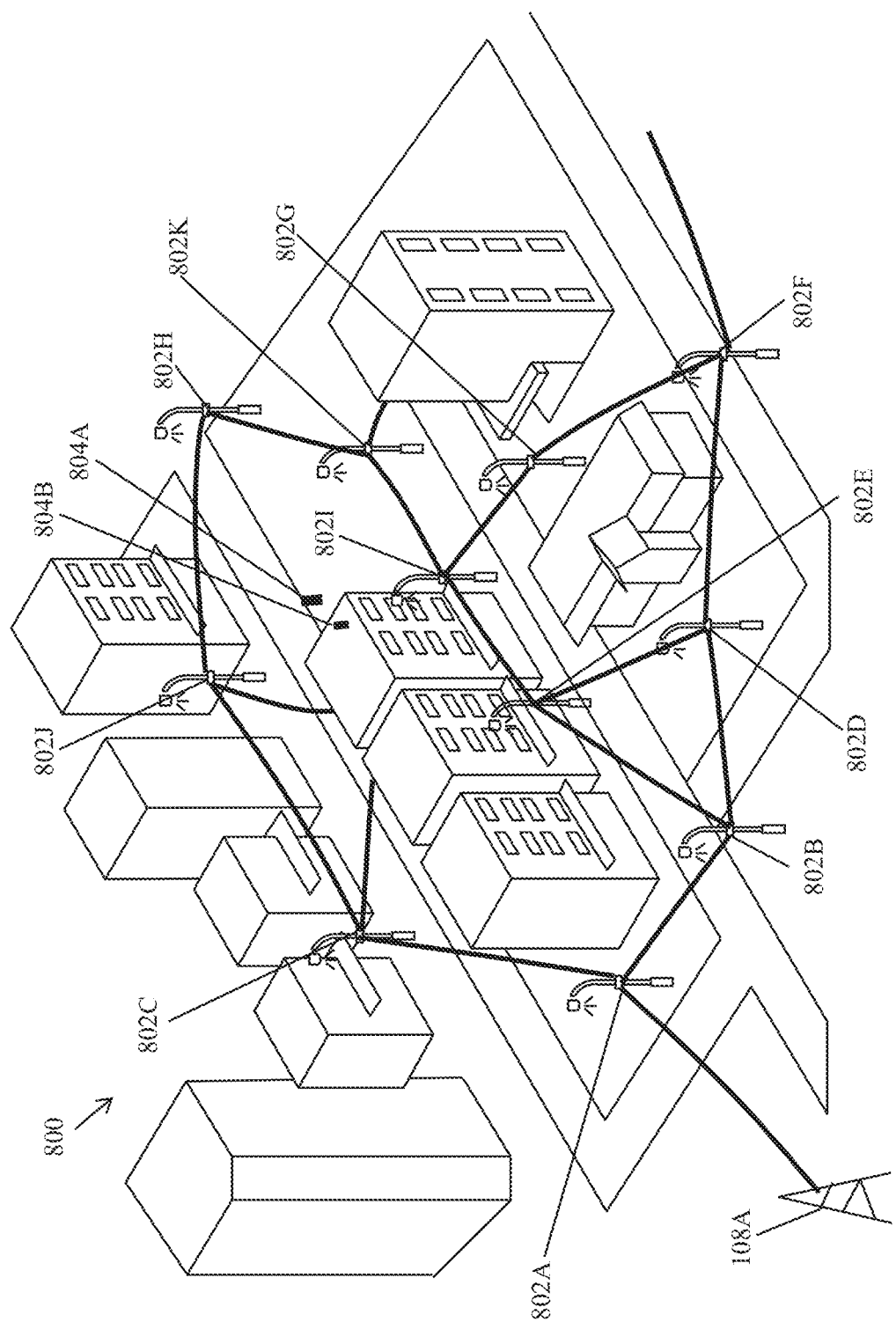
FIG. 8 is a diagram illustrating an exemplary scenario of operating a mesh network with distribution of mesh nodes to overcome signal blockage, enhance 5G coverage, and maintain service continuity, in accordance with an embodiment of the disclosure.

FIG. 8 is a diagram illustrating an exemplary scenario of operating a mesh network with distribution of mesh nodes to overcome signal blockage to enhance 5G coverage and maintain service continuity, in accordance with an embodiment of the disclosure. FIG. 8 is explained in conjunction with elements from FIGS. 1 to 7. With reference to FIG. 8, there is shown a mesh network 800 of a plurality of edge devices 104 that includes a root mesh node 802A and a set of child mesh nodes 802B to 802K. There is further shown the root mesh node 802A linked to the first RAN node 108A.

In an exemplary implementation, existing fiber network may be replaced by the mesh network 800, for example, a 60 GHz Mesh network or a mesh network operating at other mmWave frequencies to enhance the 5G cellular coverage of a RAN node, such as the first RAN node 108A, for service continuity for ultra-reliable high-performance communication and high throughput, such as multi-gigabyte throughput, with flexibility of fronthaul and backhaul networks, supporting both outdoor units (i.e., edge devices deployed outdoors) and indoor units (edge devices deployed indoors within buildings) and IP transport implementations for 4G and 5G cellular networks. For example, the first UE 804A may be unreachable by the first RAN node 108A due to signal blockage by the intermittent buildings. The mesh network 800 may be dynamically formed based on the communicated plurality of path setup parameters by the central cloud server 102 to each of the plurality of edge devices, such as the root mesh node 802A and the set of child mesh nodes 802B to 802K. A specific set of edge devices may be selected to form a communication path (i.e., a route) so that an uplink as well as downlink communication is established between the first RAN node 108A and the first UE 804A via the mesh network 800 using the selected specific set of edge devices, for example, the root mesh node 802A and the child mesh nodes 802C and 802J in an example. Alternatively, any other communication path may be dynamically set up by the central cloud server 102 when any change in signal strength of communication links of the participating mesh nodes is detected or when any change in terms of signal strength at the first UE 804A being serviced is detected when such change is predicted to influence the QoE by the first UE 804A being serviced (e.g., broken links, any change in environment, any change with respect to the signal obstructing objects or signal attenuation due to the movement of the first UE 804A). Similarly, the second UE 804B may be located within a building (indoors), where a similar arrangement of edge devices may be deployed, which may be a part of the mesh network 800. Thus, whether it is a public network, or a private network created for an enterprise within a building a group of buildings, the mesh network 800 significantly improves 5G coverage of the first RAN node 108A (e.g., a 5G enabled small cell or a gNB), overcomes signal blockage regions by use of the mesh network 800 (e.g., a 5G mesh network in this case) formed dynamically by the plurality of edge devices under the control of the central cloud server 102 of the communication system 100 and enhances the QoE. Thus, the communication system 100 that generates the mesh network 800 further significantly improves performance in terms of data throughput and signal-to-noise ratio (SNR) of one or more end-user devices, such as the first UE 804A and the second UE 804B, while ensuring seamless connectivity when employed in indoors, outdoors, or a combination thereof.

In an exemplary implementation, one or more "path tags" (or simply referred to as tags) may be inserted/removed by each edge device of the plurality of edge devices, for example, the root mesh node 802A and the child mesh nodes 802C and 802K. In an implementations, the path tags may be used at the beginning of a frame to determine its routed path across the mesh network 800. This may help to achieve a reduction in latency and may provide better 5G (even suited for 6G) cellular coverage and multi-protocol aware RF communication, which may be leveraged to improve performance and reduce cost.

In the exemplary scenario, the processor 202 may be configured to determine the primary communication path between the first RAN node 108A and the first UE 804A via the root mesh node 802A and the child mesh nodes 802C and 802J in an example. Thereafter, the processor 202 may be configured to cause the root mesh node 802A and the child mesh nodes 802C and 802J to establish the primary communication path to service the first UE 804A for uplink and downlink communication. There may be a signal obstruction in the primary communication path due to the dynamic nature of the environment, for example, due to signal attenuation as a result of a change in weather, or any signal blockage or obstructions due to movement of any object or movement of the first UE 804A. In such a case, the processor 202 of the central cloud server 102 may be further configured to communicate timing information to at least a first edge device (e.g., the root mesh node 802A) and a second edge device (e.g., the child mesh node 802B). The timing information may be indicative of a unique SFN, where the second edge device (e.g., the child mesh node 802B) may be a new mesh node not included in the primary communication path. The processor 202 of the central cloud server 102 may be further configured to cause the first edge device (e.g., the root mesh node 802A) and the second edge device (e.g., the child mesh node 802B) to execute a switching event to establish a new communication path (i.e., from the first RAN node 108A to the root mesh node 802A to the child mesh node 802B to the first UE 804A and vice-versa in that sequence) based on the communicated timing information. In this case, the switching event may be executed when the unique SFN is detected at the first edge device (e.g., the root mesh node 802A) and the second edge device (e.g., the child mesh node 802B) to establish the new communication path to maintain a continuity in the service to the one or more UEs, such as the first UE 804A, for the uplink and downlink communication. In an example, the timing information may be communicated ahead-of-time indicating that the unique SFN may be upcoming and that when the unique system frame number is detected, each of the first edge device (e.g., the root mesh node 802A) and the second edge device (e.g., the child mesh node 802B) is expected to select a new beam index and change a beam pattern to establish the new communication path in the switching event.

In another aspect, there may be a change in a surrounding environment that may affect signal quality and cause either signal attenuation or signal blockage at one or more mesh nodes (e.g., the child mesh node 802C or 802J) that form the primary communication path, thereby may potentially affect the primary communication path. In such a case, the first edge device (e.g., the root mesh node 802 in this case) may be further configured to obtain timing information at a first time instant from the first RAN node 108A or the central cloud server 102. The timing information may be indicative of a unique SFN or a sub-frame of the unique SFN that is to be received at the first edge device (i.e., the root mesh node 802A in this case). The first edge device (e.g., the root mesh node 802A in this case) may be further configured to detect the unique SFN or the sub-frame of the unique SFN at a second time instant. In an example, the timing information may be obtained from the central cloud server 102 or the RAN node (e.g., the first RAN node 108A) ahead-of-time (i.e., at the first time instant before actual SFN or sub-frame of SFN is obtained and detected at the root mesh node 802A) indicating that the unique SFN or the sub-frame of the SFN may be upcoming and that when the unique SFN or the sub-frame of the unique SFN will be detected, the root mesh node 802 is expected to select a new beam index and change a beam pattern to establish a new communication link by executing a switching event. Based on the detection of the unique SFN or the sub-frame of the unique SFN at the second time instant, the first edge device (i.e., the root mesh node 802A in this case) may be further configured to execute a switching event at the first edge device (i.e., the root mesh node 802A in this case) in which a new communication link is established with the second edge device (e.g., the child mesh node 802B in this case) neighboring the first edge device (i.e., the root mesh node 802A). The new communication link established between the first edge device (i.e., the root mesh node 802A) and the second edge device (e.g., the child mesh node 802B in this case may correspond to a change triggered in a mesh network 112 to maintain a continuity in uplink and downlink communication between one or more UEs, such as the first UE 804A via the mesh network 112 (i.e., via an alternative path different from the primary communication path formed as a result of the new communication link). Alternatively stated, a management plane may be used to obtain the timing information (i.e., precise timings) ahead-of-time so that it is less disruptive for network and a continuity of uplink and downlink communication can be achieved improving the quality of service (QoS). Thus, communication system 100 and the method of the present disclosure can effectively handle the dynamic nature of the environment, for example, any sudden and abrupt change in the environment can be handled to overcome signal blockage regions within a building (i.e., indoors) as well as outside a building (i.e., outdoors) by smartly operating the 5G mesh network without affecting the service to one or more UEs, such as the first UE 804A, from a RAN node, such as the first RAN node 108A.

Figure 9A:
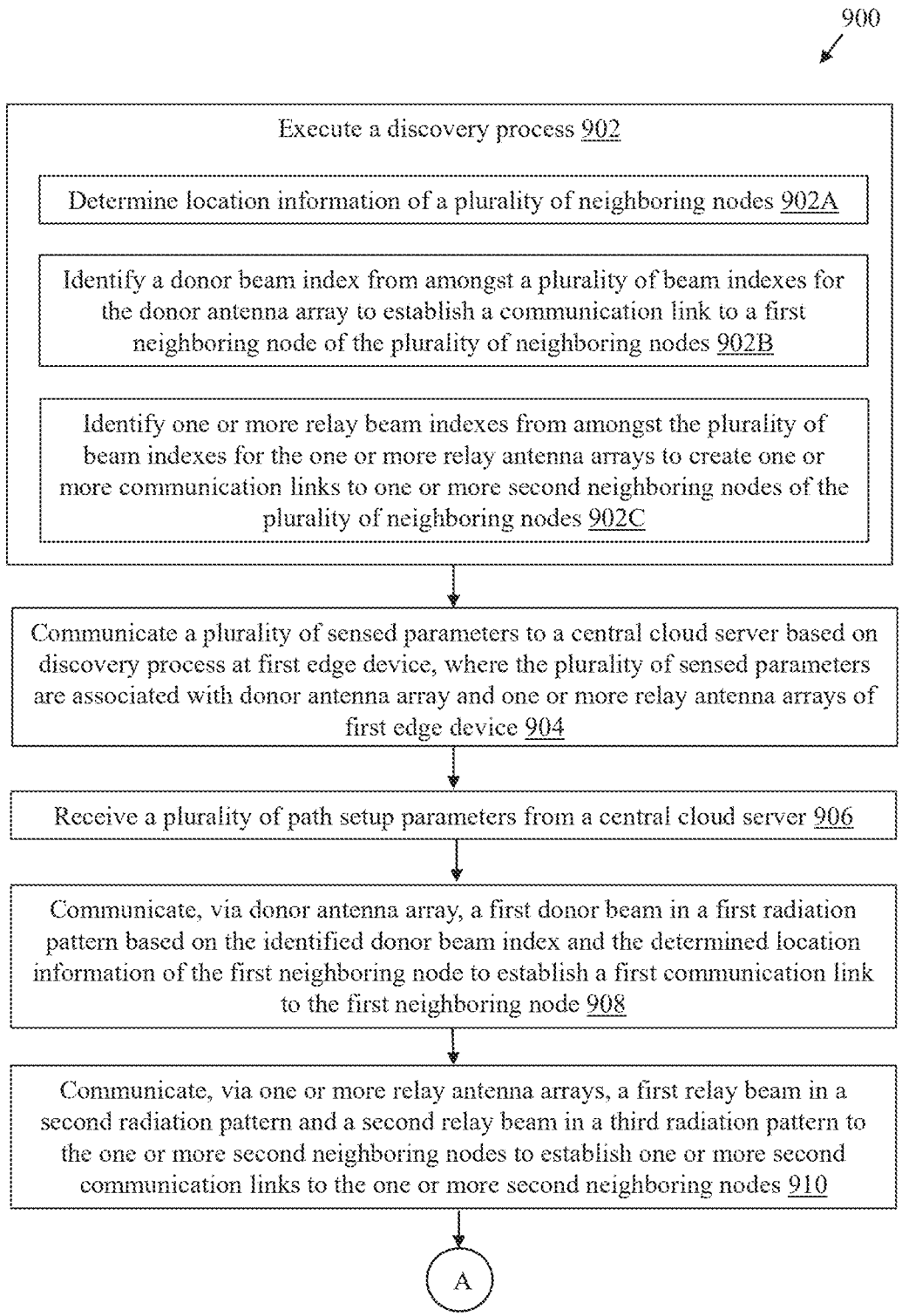
FIGS. 9A and 9B collectively is a flowchart that illustrates a communication method for operating a 5G mesh network for service continuity, in accordance with an embodiment of the disclosure.
Figure 9B:
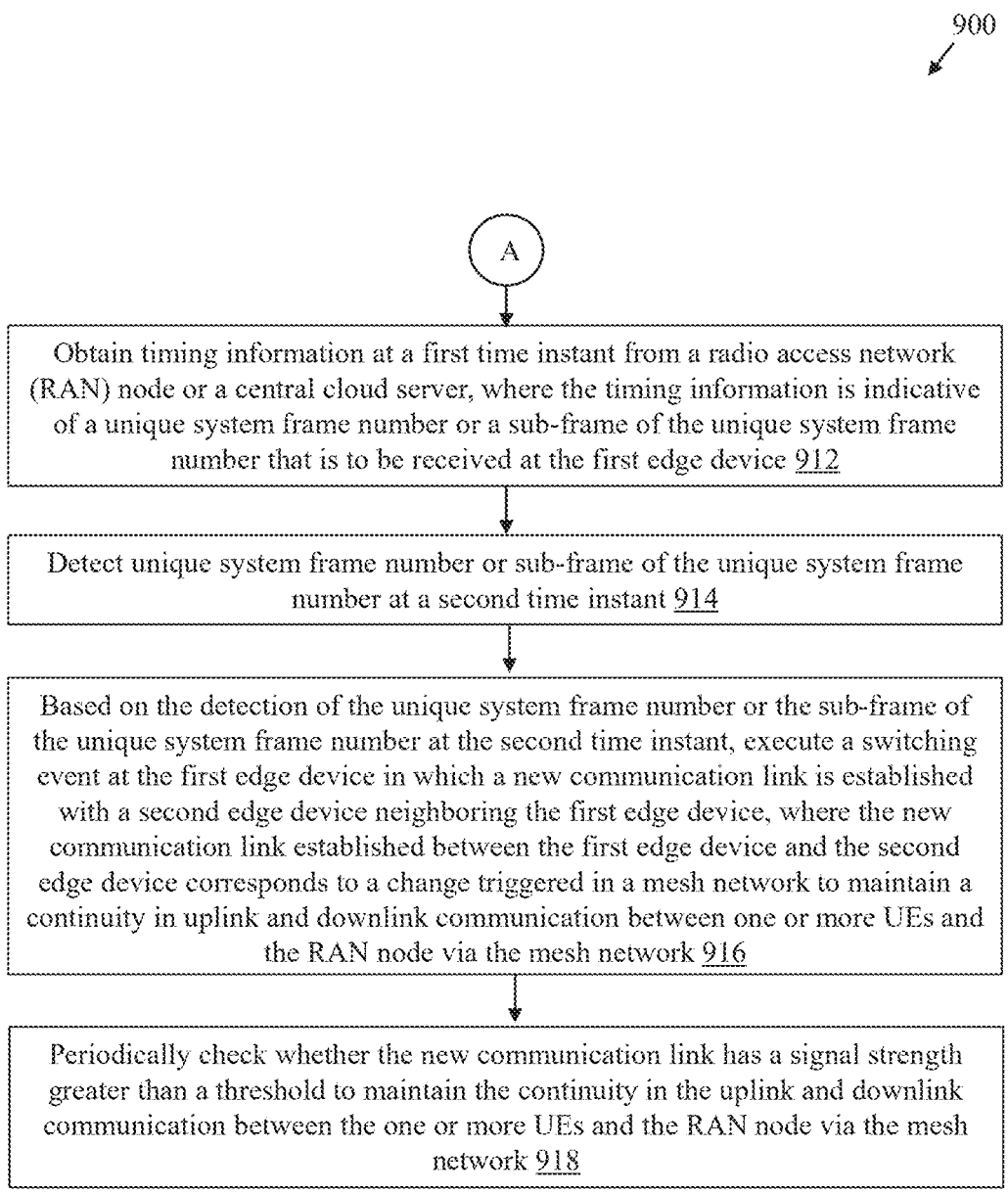

FIGS. 9A and 9B collectively is a flowchart that illustrates a communication method for operating a 5G mesh network for service continuity, in accordance with an embodiment of the disclosure. FIGS. 9A and 9B are explained in conjunction with elements from FIGS. 1 to 8. With reference to FIGS. 9A and 9B, there is shown a flowchart 900 comprising exemplary operations 902 through 918. The operations of the method depicted in the flowchart 900 may be implemented in a first edge device, such as the edge device 104A (FIGS. 1 and 3).

At 902, a discovery process may be executed. The processor 314 may be configured to execute the discovery process at a first edge device (e.g., the edge device 104A). The operation 902 may include a plurality of sub-operations, such as operations 902A, 902B, and 902C. At 902A, location information of a plurality of neighboring nodes may be determined. At 902B, a donor beam index may be identified from amongst a plurality of beam indexes for the donor antenna array 306 to establish a first communication link to a first neighboring node of the plurality of neighboring nodes. At 902C, one or more relay beam indexes may be identified from amongst the plurality of beam indexes for the one or more relay antenna arrays 310 to create one or more communication links to one or more second neighboring nodes of the plurality of neighboring nodes.

At 904, a plurality of sensed parameters 208 may be communicated to the central cloud server 102 based on the discovery process at the first edge device (e.g., the edge device 104A). The plurality of sensed parameters may be associated with the donor antenna array 306 and the one or more relay antenna arrays 310 of the first edge device (e.g., the edge device 104A).

At 906, a plurality of path setup parameters 210 may be received from the central cloud server.

At 908, a first donor beam may be communicated, via the donor antenna array 306, in a first radiation pattern based on the identified donor beam index and the determined location information of the first neighboring node (e.g., the first RAN node 108A) to establish a first communication link to the first neighboring node (e.g., the first RAN node 108A).

At 910, a first relay beam may be communicated, via the one or more relay antenna arrays 310, in a second radiation pattern and a second relay beam in a third radiation pattern to the one or more second neighboring nodes (e.g., the edge devices 104C and 104D) to establish one or more second communication links to the one or more second neighboring nodes (e.g., the edge devices 104C and 104D). At least one of the one or more second communication links is updated to a new communication link in a switching event.

At 912, timing information may be obtained at a first time instant from a radio access network (RAN) node (e.g., the first RAN node 108A) or the central cloud server 102. The timing information may be indicative of a unique system frame number (SFN) or a sub-frame of the unique SFN r that is to be received at the first edge device (e.g., the edge device 104A).

At 914, the unique SFN or the sub-frame of the unique SFN may be detected at a second time instant (by the first edge device).

At 916, based on the detection of the unique system frame number or the sub-frame of the unique SFN at the second time instant, a switching event may be executed at the first edge device (e.g., the edge device 104A) in which a new communication link may be established with a second edge device (e.g., the edge device 104B) neighboring the first edge device (e.g., the edge device 104A). The new communication link established between the first edge device (e.g., the edge device 104A) and the second edge device (e.g., the edge device 104B) may correspond to a change triggered in the mesh network 112 to maintain a continuity in uplink and downlink communication between one or more UEs 106 and the RAN node (e.g., the first RAN node 108A) via the mesh network 112. The new communication link may be a part of a communication path (e.g., an alternative path) between the RAN node (e.g., the first RAN node 108A) and the one or more UEs 106 established via a set of edge devices, where the set of edge devices comprises at least the first edge device (e.g., the edge device 104A) and the second edge device (e.g., the edge device 104B).

In an implementation, the switching event may be executed via a management plane of the mesh network 112, where the switching event may be controlled by the central cloud server 102. In another implementation, the switching event may be controlled by a scheduler of the RAN node (e.g., the first RAN node 108A). In yet another implementation, the switching event may be executed via a management plane of the mesh network 112, where the switching event may be controlled by the central cloud server 102 in coordination with the RAN node (e.g., the first RAN node 108A).

At 918, it may be periodically checked whether the new communication link has a signal strength greater than a threshold to maintain the continuity in the uplink and downlink communication between the one or more UEs 106 and the RAN node (e.g., the first RAN node 108A) via the mesh network 112.

Figure 10A:
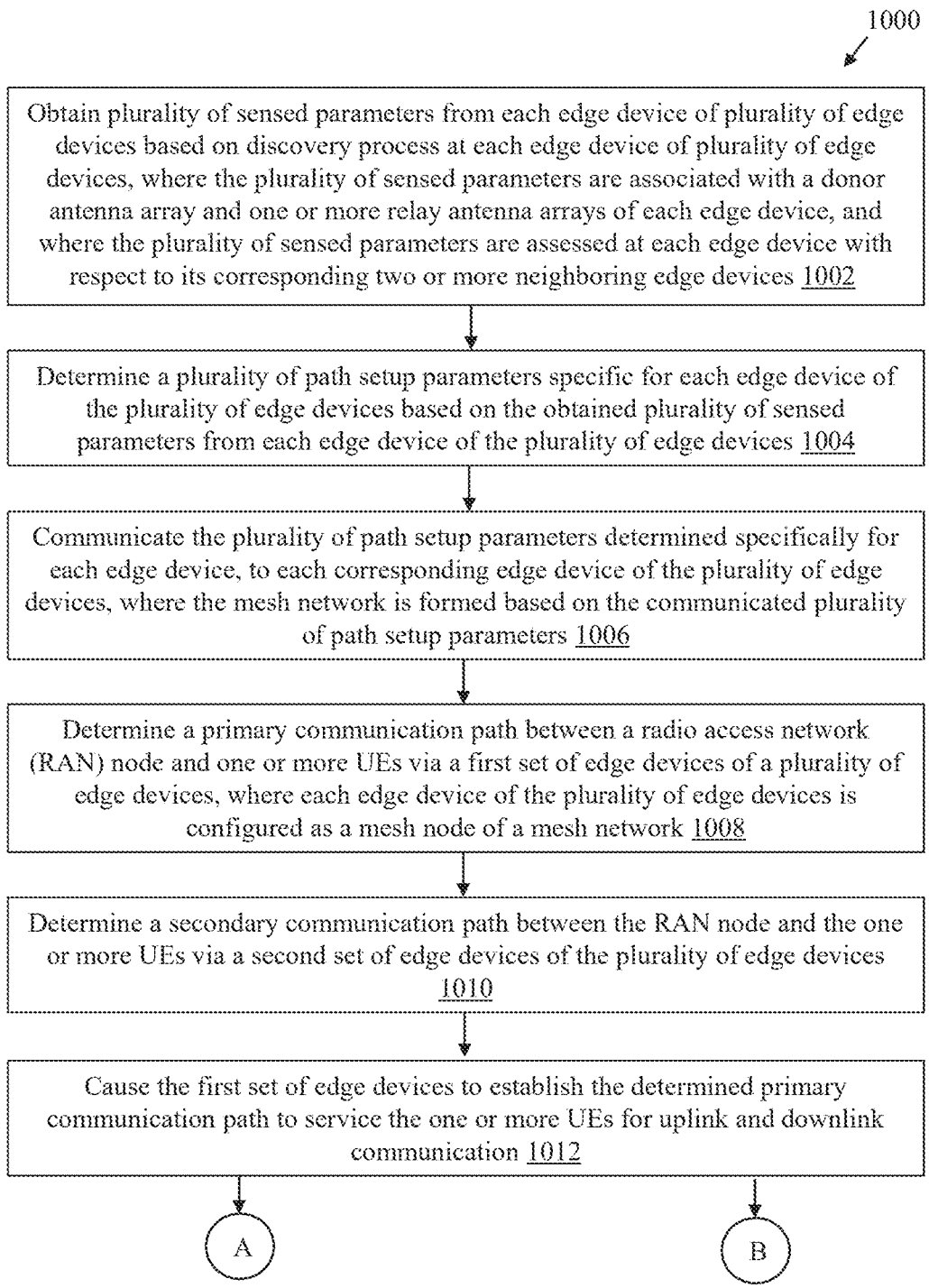
FIGS. 10A and 10B is a flowchart that illustrates a communication method for operating a 5G mesh network by executing switching events for service continuity, in accordance with another embodiment of the disclosure.
Figure 10B:
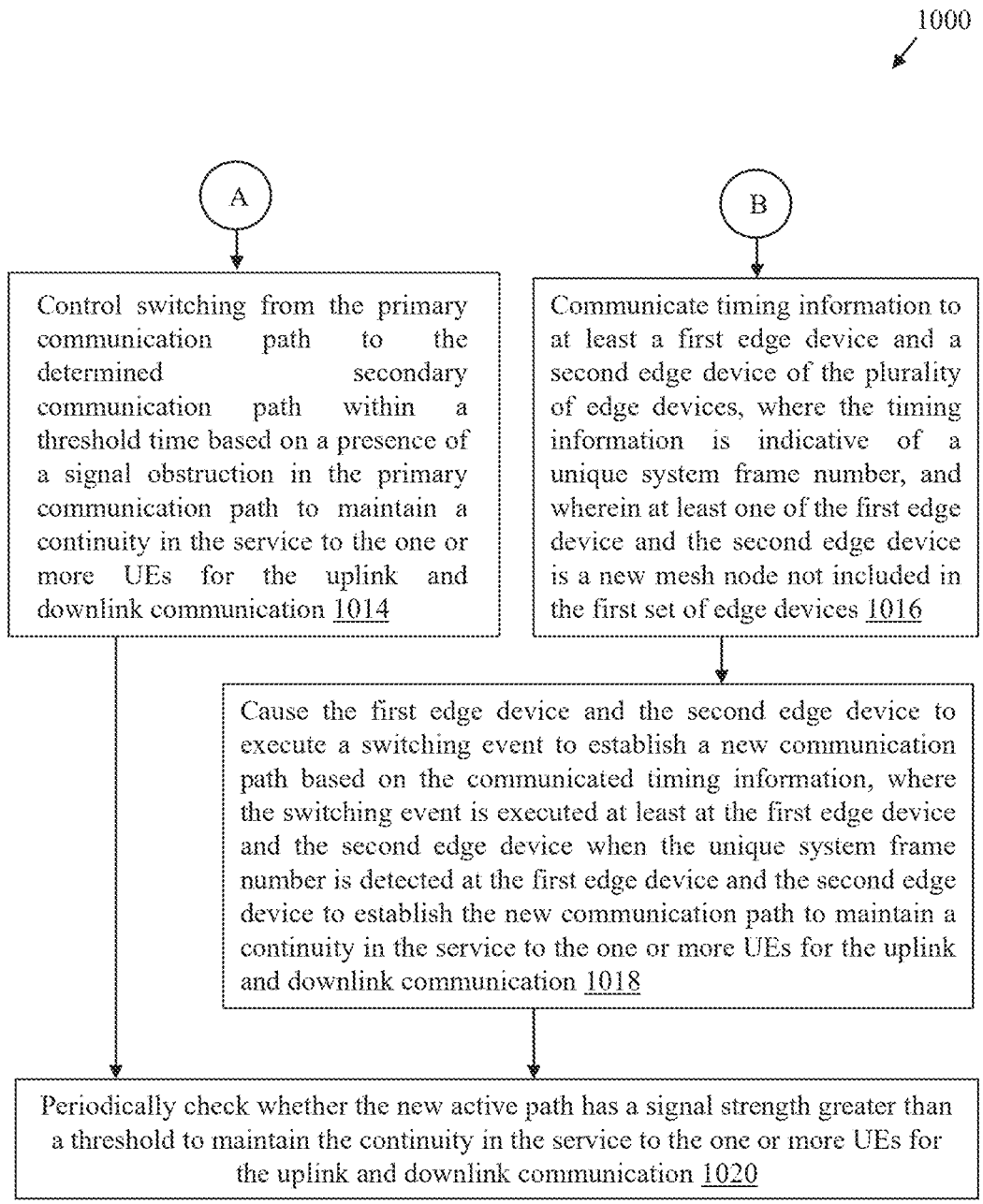

FIGS. 10A and 10B collectively is a flowchart that illustrates a communication method for operating a 5G mesh network for service continuity, in accordance with another embodiment of the disclosure. FIGS. 10A and 10B are explained in conjunction with elements from FIGS. 1 to 8. With reference to FIGS. 10A and 10B, there is shown a flowchart 1000 comprising exemplary operations 1002 through 1020. The operations of the method depicted in the flowchart 1000 may be implemented in a central cloud server, such as the central cloud server 102 (FIG. 1).

At 1002, a plurality of sensed parameters 208 may be obtained from each edge device of the plurality of edge devices 104 based on a discovery process at each edge device of the plurality of edge devices 104, where the plurality of sensed parameters 208 are associated with a donor antenna array 306 and one or more relay antenna arrays 310 of each edge device, and where the plurality of sensed parameters 208 are assessed at each edge device with respect to its corresponding two or more neighboring edge devices The processor 202 may be configured to obtain the plurality of sensed parameters 208 from each edge device of the plurality of edge devices 104.

At 1004, a plurality of path setup parameters 210 may be determined specific for each edge device of the plurality of edge devices 104 based on the obtained plurality of sensed parameters 208 from each edge device of the plurality of edge devices 104. The processor 202 may be further configured to determine the plurality of path setup parameters 210 specific for each edge device of the plurality of edge devices 104 based on the obtained plurality of sensed parameters 208 from each edge device of the plurality of edge devices 104.

At 1006, the plurality of path setup parameters 210 determined specifically for each edge device may be communicated to each corresponding edge device of the plurality of edge devices 104, where the mesh network is formed based on the communicated plurality of path setup parameters 210. The processor 202 may be further configured to communicate the plurality of path setup parameters 210 to each corresponding edge device of the plurality of edge devices 104.

At 1008, a primary communication path may be determined between a radio access network (RAN) node and one or UEs 106 via a first set of edge devices of a plurality of edge devices 104, where each edge device of the plurality of edge devices 104 is configured as a mesh node of a mesh network. The processor 202 may be further configured to determine the primary communication path between the RAN node and one or UEs 106 via the first set of edge devices of a plurality of edge devices 104.

At 1010, a secondary communication path may be determined between the RAN node and the one or more UEs 106 via a second set of edge devices of the plurality of edge devices 104. The processor 202 may be further configured to determine the secondary communication path between the RAN node and the one or more UEs 106 via a second set of edge devices of the plurality of edge devices 104.

At 1012, the first set of edge devices may be caused to establish the determined primary communication path to service the one or more UEs 106 for uplink and downlink communication. The processor 202 may be further configured to cause the first set of edge devices to establish the determined primary communication path to service the one or more UEs 106 for uplink and downlink communication. The control moves to 1014 or 1016 based on a defined setting at the central cloud server 102.

At 1014, switching may be controlled from the primary communication path to the determined secondary communication path within a threshold time based on a presence of a signal obstruction in the primary communication path to maintain a continuity in the service to the one or more UEs 106 for the uplink and downlink communication. The processor 202 may be further configured to control the switching from the primary communication path to the determined secondary communication path within a threshold time based on a presence of a signal obstruction in the primary communication path to maintain a continuity in the service to the one or more UEs 106 for the uplink and downlink communication. In an example, the controlling of the switching from the primary communication path to the determined secondary communication path may be executed via a management plane of the mesh network 112. In an implementation, the operation 914 may include one or more sub-operations. For example, a gain of an active path that corresponds to the primary communication path may be gradually decreased until the active path becomes dormant. Further, the gain of a dormant path that corresponds to the secondary communication path may be concomitantly and gradually increased until the dormant path becomes a new active path. At least one edge device of the second set of edge devices may be caused to fire one or more beams of radio frequency (R F) signals in one or more specific directions towards one or more new neighboring nodes in order to establish the determined secondary communication path.

At 1016, timing information may be communicated to at least the first edge device (e.g., the edge device 104A) and the second edge device (e.g., the edge device 104B) of the plurality of edge devices 104, where the timing information may be indicative of a unique system frame number (SFN). At least one of the first edge device (e.g., the edge device 104A) and the second edge device (e.g., the edge device 104B) may be a new mesh node not included in the first set of edge devices.

At 1018, the first edge device (e.g., the edge device 104A) and the second edge device (e.g., the edge device 104B) may be caused o to execute a switching event to establish a new communication path based on the communicated timing information. The switching event may be executed at least at the first edge device (e.g., the edge device 104A) and the second edge device (e.g., the edge device 104B) when the unique SFN is detected at the first edge device (e.g., the edge device 104A) and the second edge device (e.g., the edge device 104B) to establish the new communication path to maintain a continuity in the service to the one or more UEs 106 for the uplink and downlink communication. The switching event may be executed via a management plane of the mesh network 112. The switching event may be controlled by at least one of the central cloud server 102 independent of the RAN node (e.g., the first RAN node 108A) or the central cloud server 102 in coordination with the RAN node (e.g., the first RAN node 108A). In an implementation, the timing information may be communicated ahead-of-time to the first edge device and the second edge device indicating that the unique system frame number is upcoming and that when the unique system frame number is detected, each of the first edge device and the second edge device is expected to select a new beam index and change a beam pattern to establish the new communication path in the switching event.

At 1020, it may be periodically checked whether the new active path has a signal strength greater than a threshold to maintain the continuity in the service to the one or more UEs for the uplink and downlink communication. The processor 202 may be configured to periodically check whether the new active path has a signal strength greater than the threshold to maintain the continuity in the service to the one or more UEs 106 for the uplink and downlink communication.

Various embodiments of the disclosure may provide a non-transitory computer-readable medium having stored thereon computer implemented instructions that when executed by a computer causes to execute operations in the central cloud server 102 comprising: determining the primary communication path between the radio access network (RAN) node and one or more user equipment (UEs) 106 via the first set of edge devices of a plurality of edge devices 104, where each edge device of the plurality of edge devices 104 is configured as a mesh node of a mesh network. The operations further comprise causing the first set of edge devices (e.g., the edge devices 104A and 104D) to establish the determined primary communication path to service the one or more UEs 106 for uplink and downlink communication. The operations further comprise communicating timing information to at least a first edge device (e.g., the edge device 104A) and a second edge device (e.g., the edge device 104B) of the plurality of edge devices 104. The timing information may be indicative of a unique system frame number (SF N), where at least one of the first edge device (e.g., the edge device 104A or a mesh node A) and the second edge device (e.g., the edge device 104B or a mesh node B) may be a new mesh node (e.g., the edge device 104B) not included in the first set of edge devices (e.g., the edge devices 104A and 104D). The operations further comprise causing the first edge device (e.g., the edge device 104A) and the second edge device (e.g., the edge device 104B) to execute a switching event to establish a new communication path based on the communicated timing information, wherein the switching event may be executed at least at the first edge device (e.g., the edge device 104A or the mesh node A) and the second edge device (e.g., the edge device 104B or the mesh node B) when the unique SFN is detected at the first edge device and the second edge device to establish the new communication path to maintain a continuity in the service to the one or more UEs 106 for the uplink and downlink communication.

Various embodiments of the disclosure may further provide the communication system 100 (FIG. 1). The communication system 100 may comprise an edge device 104A that may comprise the donor antenna array 306, one or more relay antenna arrays 310, and a processor 314, where the processor 314 may be configured to obtain timing information at a first time instant from a RAN node (e.g., the first RAN node 108A) or the central cloud server 102, wherein the timing information may be indicative of a unique SFN or a sub-frame of the unique SFN that is to be received at the first edge device (i.e., the edge device 104A). The processor 314 may be further configured to detect the unique SFN or the sub-frame of the unique SFN at a second time instant. Based on the detection of the unique SFN or the sub-frame of the unique SFN at the second time instant, the processor 314 may be further configured to execute a switching event at the first edge device (i.e., the edge device 104A) in which a new communication link is established with a second edge device (e.g., the edge device 104B) neighboring the first edge device (i.e., the edge device 104A). The new communication link established between the first edge device (i.e., the edge device 104A) and the second edge device (e.g., the edge device 104B) may correspond to a change triggered in a mesh network 112 to maintain a continuity in uplink and downlink communication between one or more UEs 106 and the RAN node (e.g., the first RAN node 108A) via the mesh network 112 (i.e., via an alternative path different from the primary communication path formed as a result of the new communication link).

Various embodiments of the disclosure may provide a non-transitory computer-readable medium having stored thereon computer implemented instructions that when executed by a computer causes to execute operations comprising: obtaining timing information at a first time instant from a RAN node (e.g., the first RAN node 108A) or the central cloud server 102, wherein the timing information may be indicative of a unique SFN or a sub-frame of the unique SFN that is to be received at the first edge device (i.e., the edge device 104A); detecting the unique SFN or the sub-frame of the unique SFN at a second time instant; and based on the detection of the unique SFN or the sub-frame of the unique SFN at the second time instant, executing a switching event at the first edge device (i.e., the edge device 104A) in which a new communication link is established with a second edge device (e.g., the edge device 104B) neighboring the first edge device (i.e., the edge device 104A). The new communication link established between the first edge device (i.e., the edge device 104A) and the second edge device (e.g., the edge device 104B) may correspond to a change triggered in a mesh network 112 to maintain a continuity in uplink and downlink communication between one or more UEs 106 and the RAN node (e.g., the first RAN node 108A) via the mesh network 112 (i.e., via an alternative path different from the primary communication path formed as a result of the new communication link).

While various embodiments described in the present disclosure have been described above, it should be understood that they have been presented by way of example and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A communication system, comprising:
a plurality of edge devices comprising a first edge device, wherein the first edge device comprises a donor antenna array, one or more relay antenna arrays, and a processor that is configured to:
fire a plurality of first beams from the donor antenna array based on different first beam indexes of a beam book at the donor antenna array;
fire a plurality of second beams from the one or more relay antenna arrays based on different second beam indexes of the beam book at the one or more relay antenna arrays;
measure signal strength of each fired beam of the fired plurality of first beams and the fired plurality of second beams;
identify a donor beam index from amongst the different first beam indexes for the donor antenna array based on the measured signal strength,
wherein the identified donor beam index has a first signal strength greater than a threshold;
identify one or more relay beam indexes from amongst the different second beam indexes for the one or more relay antenna arrays based on the measured signal strength,
wherein the identified one or more relay beam indexes have a second signal strength greater than the threshold;
establish a first communication link to an upstream neighboring node of a plurality of neighboring nodes based on the identified donor beam index;
create one or more second communication links to one or more downstream neighboring nodes of the plurality of neighboring nodes based on the identified one or more relay beam indexes; and
create a mesh network of the plurality of edge devices based on the establishment of the first communication link to the upstream neighboring node and the establishment of the one or more second communication links to the one or more downstream neighboring nodes.

2. The communication system of claim 1, wherein the plurality of neighboring nodes comprise at least one of: two or more neighboring edge devices of the plurality of edge devices or a combination of the two or more neighboring edge devices and at least one radio access network (RAN) node.

3. The communication system of claim 1, wherein the processor is further configured to communicate sensed parameters to a central cloud server based on the measured signal strength.

4. The communication system of claim 3, wherein the processor is further configured to receive path setup parameters from the central cloud server based on the communicated sensed parameters.

5. The communication system of claim 1, wherein the processor is further configured to communicate a first donor beam in a first radiation pattern based on the identified donor beam index and location information of the upstream neighboring node to establish the first communication link.

6. The communication system of claim 1, wherein the processor is further configured to communicate a first relay beam in a second radiation pattern and a second relay beam in a third radiation pattern based on the identified one or more relay beam indexes and location information of the one or more downstream neighboring nodes to establish the one or more second communication links.

7. The communication system of claim 1, wherein the mesh network increases a spatial coverage of at least one radio access network (RAN) node to serve one or more user equipment (UEs) with a throughput rate greater than a threshold rate.

8. The communication system of claim 1, wherein the processor is further configured to obtain timing information at a first time instant from a radio access network (RAN) node or a central cloud server,
wherein the timing information indicates a unique system frame number or a sub-frame of the unique system frame number that is to be received at the first edge device.

9. The communication system of claim 8, wherein the processor is further configured to:
detect the unique system frame number or the sub-frame of the unique system frame number at a second time instant; and
execute a switching event at the first edge device based on the detection of the unique system frame number or the sub-frame of the unique system frame number at the second time instant.

10. The communication system of claim 9, wherein the switching event comprises establishing a new communication link with a second edge device of the plurality of edge devices to maintain continuity in uplink and downlink communication between one or more user equipment (UEs) and the RAN node via the mesh network, and wherein the second edge device neighbors the first edge device.

11. The communication system of claim 1, wherein the plurality of edge devices comprises:
a root mesh node as the first edge device communicatively coupled to a radio access network (RAN) node, and
a set of child mesh nodes communicatively coupled directly or indirectly to the root mesh node in the mesh network.

12. A communication method, comprising:
in a first edge device of a plurality of edge devices:
firing a plurality of first beams from a donor antenna array of the first edge device based on different first beam indexes of a beam book at the donor antenna array;
firing a plurality of second beams from one or more relay antenna arrays of the first edge device based on different second beam indexes of the beam book at the one or more relay antenna arrays;
measuring signal strength of each fired beam of the fired plurality of first beams and the fired plurality of second beams;
identifying a donor beam index from amongst the different first beam indexes for the donor antenna array based on the measured signal strength,
wherein the identified donor beam index has a first signal strength greater than a threshold;
identifying one or more relay beam indexes from amongst the different second beam indexes for the one or more relay antenna arrays based on the measured signal strength,
wherein the identified one or more relay beam indexes have a second signal strength greater than the threshold;
establishing a first communication link to an upstream neighboring node of a plurality of neighboring nodes based on the identified donor beam index;
creating one or more second communication links to one or more downstream neighboring nodes of the plurality of neighboring nodes based on the identified one or more relay beam indexes; and
creating a mesh network of the plurality of edge devices based on the establishment of the first communication link to the upstream neighboring node and the establishment of the one or more second communication links to the one or more downstream neighboring nodes.

13. The communication method of claim 12, wherein the plurality of neighboring nodes comprises at least one of: two or more neighboring edge devices of the plurality of edge devices or a combination of the two or more neighboring edge devices and at least one radio access network (RAN) node.

14. The communication method of claim 12, further comprising communicating sensed parameters to a central cloud server based on the measured signal strength.

15. The communication method of claim 14, further comprising receiving path setup parameters from the central cloud server based on the communicated sensed parameters.

16. The communication method of claim 12, further comprising communicating a first donor beam in a first radiation pattern based on the identified donor beam index and location information of the upstream neighboring node to establish the first communication link.

17. The communication method of claim 12, further comprising communicating a first relay beam in a second radiation pattern and a second relay beam in a third radiation pattern based on the identified one or more relay beam indexes and location information of the one or more downstream neighboring nodes to establish the one or more second communication links.

18. The communication method of claim 12, wherein the mesh network increases a spatial coverage of at least one radio access network (RAN) node to serve one or more user equipment (UEs) with a throughput rate greater than a threshold rate.

19. The communication method of claim 12, further comprising obtaining timing information at a first time instant from a radio access network (RAN) node or a central cloud server, wherein the timing information indicates a unique system frame number or a sub-frame of the unique system frame number that is to be received at the first edge device.

20. The communication method of claim 19, further comprising:
detecting the unique system frame number or the sub-frame of the unique system frame number at a second time instant; and executing a switching event at the first edge device based on the detection of the unique system frame number or the sub-frame of the unique system frame number at the second time instant.

* * * * *